United States Patent
Buezis et al.

(10) Patent No.: US 7,523,762 B2
(45) Date of Patent: Apr. 28, 2009

(54) MODULATING GAS VALVES AND SYSTEMS

(75) Inventors: James Buezis, Plymouth, MN (US); Glenn Bergum, St. Anthony, MN (US); Adam Z. Eskridge, Minneapolis, MN (US); Don Kasprzyk, Maple Grove, MN (US); Sybrandus B. V. Munsterhuis, Dalen (NL)

(73) Assignee: Honeywell International Inc., Morristown, NJ (US)

( * ) Notice: Subject to any disclaimer, the term of this patent is extended or adjusted under 35 U.S.C. 154(b) by 589 days.

(21) Appl. No.: 11/277,202

(22) Filed: Mar. 22, 2006

(65) Prior Publication Data

US 2007/0221276 A1 Sep. 27, 2007

(51) Int. Cl.
G05D 16/06 (2006.01)
(52) U.S. Cl. .................. 137/613; 137/489; 137/495; 137/510
(58) Field of Classification Search .................. 137/613, 137/489, 495, 510, 487.5, 488; 251/30.01
See application file for complete search history.

(56) References Cited

U.S. PATENT DOCUMENTS

| | | | |
|---|---|---|---|
| 2,403,692 A | 7/1946 | Tibbetts | |
| 2,975,307 A | 3/1961 | Schroeder et al. | |
| 3,304,406 A | 2/1967 | King | |
| 3,381,623 A | 5/1968 | Elliott | |
| 3,414,010 A | 12/1968 | Sparrow | |
| 3,641,373 A | 2/1972 | Elkuch | |
| 3,769,531 A | 10/1973 | Elkuch | |
| 3,803,424 A | 4/1974 | Smiley et al. | |
| 3,809,313 A | 5/1974 | Branson | |
| 3,810,578 A | 5/1974 | Matthews | |
| 3,838,810 A | 10/1974 | McMann et al. | |
| 3,947,644 A | 3/1976 | Uchikawa | |
| 3,973,576 A | 8/1976 | Dietiker et al. | |
| 3,973,976 A | 8/1976 | Boyd | |
| 3,993,939 A | 11/1976 | Slavin et al. | |
| 4,115,036 A | 9/1978 | Peterson | |
| 4,140,936 A | 2/1979 | Bullock | |

(Continued)

FOREIGN PATENT DOCUMENTS

DE 2509893 9/1976

(Continued)

OTHER PUBLICATIONS

"Large-Scale Linearization Circuit for Electrostatic Motors" IBM Technical Disclosure Bulletin, U.S. IBM Corporation, Bulletin, vol. 37, No. 10, pp. 563-564, Oct. 1, 1994.

(Continued)

*Primary Examiner*—Kevin L Lee

(57) ABSTRACT

Modulating gas valves and systems for modulating gas flow to gas-fired appliances are disclosed. An illustrative modulating gas valve can include at least one main valve adapted to regulate the flow of gas through a main gas conduit, at least one regulator for regulating the gas pressure outputted by each main valve between a first gas pressure and a second gas pressure, and a modulator adapted to variably modulate the gas outputted by the gas valve at a pressure between the first and second gas pressures. The modulator can be used to modulate the main gas valve or valves between an infinite or discrete number of positions.

43 Claims, 17 Drawing Sheets

U.S. PATENT DOCUMENTS

| | | | |
|---|---|---|---|
| 4,188,013 A | 2/1980 | Battersby et al. |
| 4,188,972 A | 2/1980 | van der Zee |
| 4,197,737 A | 4/1980 | Pittman |
| 4,242,080 A | 12/1980 | Tabei |
| 4,303,384 A | 12/1981 | Barnes |
| 4,360,955 A | 11/1982 | Block |
| 4,413,975 A | 11/1983 | Turner et al. |
| 4,418,886 A | 12/1983 | Holzer |
| 4,442,853 A | 4/1984 | Gort |
| 4,453,169 A | 6/1984 | Martner |
| 4,478,076 A | 10/1984 | Bohrer |
| 4,478,077 A | 10/1984 | Bohrer et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,585,209 A | 4/1986 | Aine et al. |
| 4,619,438 A | 10/1986 | Coffee |
| 4,624,632 A | 11/1986 | Barnes et al. |
| 4,651,564 A | 3/1987 | Johnson et al. |
| 4,654,546 A | 3/1987 | Kirjavainen |
| 4,722,360 A | 2/1988 | Odajima et al. |
| 4,754,920 A | 7/1988 | Turner et al. |
| 4,756,508 A | 7/1988 | Giachino et al. |
| 4,821,999 A | 4/1989 | Ohtaka |
| 4,829,826 A | 5/1989 | Valentin et al. |
| 4,832,070 A | 5/1989 | James et al. |
| 4,898,200 A | 2/1990 | Odajima et al. |
| 4,911,616 A | 3/1990 | Laumann, Jr. |
| 4,938,742 A | 7/1990 | Smits |
| 4,939,405 A | 7/1990 | Okuyama et al. |
| 5,065,978 A | 11/1991 | Albarda et al. |
| 5,069,419 A | 12/1991 | Jerman |
| 5,078,581 A | 1/1992 | Blum et al. |
| 5,082,242 A | 1/1992 | Bonne et al. |
| 5,085,562 A | 2/1992 | van Lintel |
| 5,096,388 A | 3/1992 | Weinberg |
| 5,097,858 A | 3/1992 | Zlokovitz et al. |
| 5,129,794 A | 7/1992 | Beatty |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,192,197 A | 3/1993 | Culp |
| 5,193,993 A | 3/1993 | Dietiker |
| 5,203,688 A | 4/1993 | Dietiker |
| 5,206,557 A | 4/1993 | Bobbio |
| 5,215,115 A | 6/1993 | Dietiker |
| 5,219,278 A | 6/1993 | van Lintel |
| 5,224,843 A | 7/1993 | van Lintel |
| 5,244,527 A | 9/1993 | Aoyagi |
| 5,244,537 A | 9/1993 | Ohnstein |
| 5,322,258 A | 6/1994 | Bosch et al. |
| 5,323,999 A | 6/1994 | Bonne et al. |
| 5,325,880 A | 7/1994 | Johnson et al. |
| 5,336,062 A | 8/1994 | Richter |
| 5,368,571 A | 11/1994 | Horres, Jr. |
| 5,407,128 A | 4/1995 | Schultz |
| 5,435,343 A | 7/1995 | Buezis |
| 5,441,597 A | 8/1995 | Bonne et al. |
| 5,452,878 A | 9/1995 | Gravesen et al. |
| 5,499,909 A | 3/1996 | Yamada et al. |
| 5,503,549 A | 4/1996 | Iasella |
| 5,526,172 A | 6/1996 | Kanack |
| 5,529,465 A | 6/1996 | Zengerle et al. |
| 5,536,963 A | 7/1996 | Polla |
| 5,541,465 A | 7/1996 | Higuchi et al. |
| 5,552,654 A | 9/1996 | Konno et al. |
| 5,571,401 A | 11/1996 | Lewis et al. |
| 5,642,015 A | 6/1997 | Whitehead et al. |
| 5,683,159 A | 11/1997 | Johnson |
| 5,696,662 A | 12/1997 | Bauhahn |
| 5,725,363 A | 3/1998 | Bustgens et al. |
| 5,735,503 A | 4/1998 | Hietkamp |
| 5,759,014 A | 6/1998 | van Lintel |
| 5,759,015 A | 6/1998 | van Lintel et al. |
| 5,792,957 A | 8/1998 | Luder et al. |
| 5,808,205 A | 9/1998 | Romo |
| 5,822,170 A | 10/1998 | Cabuz et al. |
| 5,836,750 A | 11/1998 | Cabuz |
| 5,839,467 A | 11/1998 | Saaski et al. |
| 5,863,708 A | 1/1999 | Zanzucchi et al. |
| 5,878,741 A | 3/1999 | Dempsey et al. |
| 5,901,939 A | 5/1999 | Cabuz et al. |
| 5,911,872 A | 6/1999 | Lewis et al. |
| 5,944,257 A | 8/1999 | Dietiker et al. |
| 5,954,079 A | 9/1999 | Barth et al. |
| 5,971,355 A | 10/1999 | Biegelsen et al. |
| 6,029,705 A | 2/2000 | Happe |
| 6,050,281 A | 4/2000 | Adams et al. |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,167,761 B1 | 1/2001 | Hanzawa et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,240,944 B1 | 6/2001 | Ohnstein et al. |
| 6,288,472 B1 | 9/2001 | Cabuz et al. |
| 6,373,682 B1 | 4/2002 | Goodwin-Johansson |
| 6,418,793 B1 | 7/2002 | Pechoux et al. |
| 6,445,053 B1 | 9/2002 | Cho |
| 6,496,348 B2 | 12/2002 | McIntosh |
| 6,508,528 B2 | 1/2003 | Fujii et al. |
| 6,520,753 B1 | 2/2003 | Grosjean et al. |
| 6,561,791 B1 | 5/2003 | Vrolijk et al. |
| 6,571,817 B1 | 6/2003 | Bohan, Jr. et al. |
| 6,579,087 B1 | 6/2003 | Vrolijk |
| 6,590,267 B1 | 7/2003 | Goodwin-Johansson et al. |
| 6,637,669 B2 | 10/2003 | Areso |
| 6,640,642 B1 | 11/2003 | Onose et al. |
| 6,651,506 B2 | 11/2003 | Lee et al. |
| 6,880,548 B2 | 4/2005 | Schultz et al. |
| 6,918,756 B2 | 7/2005 | Fredricks et al. |
| 6,923,204 B2 * | 8/2005 | Dalton et al. ............ 137/489 |
| 7,222,639 B2 * | 5/2007 | Bonne et al. ............ 137/613 |
| 2002/0078756 A1 | 6/2002 | Akiyama et al. |
| 2002/0174706 A1 | 11/2002 | Gokhfeld |
| 2003/0005774 A1 | 1/2003 | Suzuki et al. |
| 2003/0019299 A1 | 1/2003 | Horie et al. |
| 2003/0033884 A1 | 2/2003 | Beekhuizen et al. |
| 2003/0189809 A1 | 10/2003 | Ishikura |
| 2003/0205090 A1 | 11/2003 | Jakobsen |
| 2004/0035211 A1 | 2/2004 | Pinto et al. |
| 2004/0060360 A1 | 4/2004 | Chen |
| 2004/0075070 A1 | 4/2004 | Munsterhuis |
| 2004/0173600 A1 | 9/2004 | Munsterhuis et al. |
| 2004/0176859 A1 | 9/2004 | Chian et al. |
| 2004/0200530 A1 | 10/2004 | Dalton et al. |
| 2005/0041437 A1 | 2/2005 | Chian et al. |
| 2005/0161516 A1 | 7/2005 | Munsterhuis |

FOREIGN PATENT DOCUMENTS

| | | |
|---|---|---|
| DE | 19617852 | 10/1997 |
| EP | 0744821 | 11/1996 |

| | | |
|---|---|---|
| JP | 02-086258 | 3/1990 |
| JP | 05-219760 | 8/1993 |
| SU | 744877 | 6/1980 |
| WO | 9729538 | 8/1997 |
| WO | 0028215 | 5/2000 |
| WO | 0133078 | 5/2001 |

OTHER PUBLICATIONS

Athavale et al., "Coupled Electrostatics-Structures-Fluidic Simulations of A Bead Mesopump," Proceedings of the International Mechanical Engineers Congress & Exhibition, pp. 1-7, Oct. 1999.

Bertz et al., "Silicon Grooves With Sidewall Angles Down 1° made By Dry Etching", pp. 331-339, prior to Dec. 29, 2004.

Bonne et al. "Actuation-Based Fuel Gas Microsensors", IGT Symposium on "Natural Gas Quality, Energy Measurement, Metering and Utilization Practices", 17 pages, Mar. 2001.

Branebjerg, "A New Electrostatic Actuator Providing Improved Stroke Length and Force." IEEE, pp. 6-11, Feb. 4-7, 1992.

Bustgens et al., "Micropump Manufactured by Thermoplastic Molding" IEEE, pp. 18-21, 1994.

Cabuz et al., "Factors Enhancing the Reliability of Touch-Mode Electrostatic Actuators," Sensors and Actuators 79, pp. 245-250, 2000.

Cabuz et al., "Mesoscopic Sampler Based on 3D Array of Electrostatically Activated Diaphragms," Proceedings of the 10th Int. Conf. On Solid-State Sensors and Actuators, Transducers 1999.

C. Cabuz et al., "The Dual Diaphragm Pump," 4 pages prior to Dec. 29, 2004.

Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.

Cabuz. "Tradeoffs in MEMS Materials," SPIE, vol. 2881, pp. 160-170, prior to Dec. 29, 2004.

Cabuz, "Electrical Phenomena at the Interface of Rolling-Contact, Electrostatic Actuators," 16 pages, prior to Dec. 29, 2004.

Cabuz, "Dielectric Related Effects in Micromachined Electrostatic Actuators," IEEE, 1999 Conference on Electrical Insulation and Dielectric Phenomena, pp. 327-332, 1999.

Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.

Halg, "On a Nonvolatile Memory Cell Based on Micro-Electro-Mechanics", IEEE pp. 172-176, 1990.

Minami K et al., "Fabrication of Distributed Electrostatic Micro Actuator (DEMA)," IEEE Journal of Microelectromechanical Systems, vol. 2, No. 3, pp. 121-127, Sep. 1993.

Ohnstein et al., "Micromachined Silicon Microvalve," IEEE, pp. 95-98, 1990.

Porex Technologies, brochure, 4 pages, prior to Dec. 29, 2004.

Shikida et al., "Characteristics of an Electrostatically-Driven Gas Valve Under High Pressure Conditions," IEEE , pp. 235-240, 1994.

Shikida et al., "Fabrication of An S-Shaped Microactuator," IEEE Journal of Microelectromechanical Systems, vol. 6, No. 1, pp. 18-24, Mar. 1997.

Shikida et al., "Electrostatically Driven Gas Valve With High Conductance," IEEE Journal of Microelectromechanical Systems, vol. 3, No. 2, pp. 76-80, Jun. 1994.

Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.

Wagner et al., "Bistable Microvalve with Pneumatically Coupled Membranes," IEEE, pp. 384-388, 1996.

www.white-rodgers.com, "36G22, 36G23, 36G24, & 36G52 DSI and HSI Single Stage Gemini Combination Gas Valve Installation Instructions," White-Rodgers, 5 pages, prior to Mar. 22, 2006.

www.white-rodgers.com, "36G Gas Valves, Gas Burner Controls," White-Rodgers, 1 page, prior to Mar. 22, 2006.

Yang et al., "Fluorescent Porous Polymer Films as TNT Chemosensors: Electronic and Structural Effects", J. Am. Chem. Soc., pp. 11864-11873, 1998.

Yang et al., "Porous Shape Persistent Fluorescent Polymer Films: An Approach to TNT Sensory Materials", J. Am. Chem. Soc., pp. 5321-5322, 1998.

* cited by examiner

MODULATING GAS VALVES AND SYSTEMS

FIELD

The present invention relates generally to the field of control valves. More specifically, the present invention pertains to modulating gas valves and systems for modulating gas flow to gas-fired appliances.

BACKGROUND

Gas valves are commonly used in conjunction with gas-fired appliances for regulating gas flow and/or gas pressure at specific limits established by the manufacturer or by industry standard. Such devices can be used, for example, to establish an upper gas flow limit to prevent over-combustion or fuel-rich combustion within the appliance, or to establish a lower limit to prevent combustion when the supply of gas is insufficient to permit proper operation of the appliance. Examples of gas-fired appliances that may employ such gas valves can include, but are not limited to, water heaters, furnaces, fireplace inserts, gas stoves, gas clothes dryers, gas grills, or any other such device where gas control is desired. Typically, such appliances utilize fuels such as natural gas or liquid propane as the primary fuel source, although other liquid and/or gas fuel sources may be provided depending on the type of appliance to be controlled.

In a fuel-fired, storage-type water heater, for example, a combustion chamber and air plenum are typically disposed adjacent a water storage tank along with a gas valve for controlling the flow of gas into the water heater. A burner element, fuel manifold tube, ignition source, thermocouple, and pilot tube can also be provided as part of the burner system for igniting the fuel within the combustion chamber. During operation, when the temperature of the water within the tank falls below a minimum temperature, metered fuel is introduced via the gas valve through the fuel manifold tube and burner element and into the combustion chamber. The fuel is then ignited by a pilot flame or other ignition source, causing fuel combustion at the burner element. Air may be drawn into the air plenum under the assistance of an air blower, causing the air to mix with the fuel to support the combustion within the combustion chamber. The products of the combusted air-fuel mixture are then fed through a flue or heat exchanger tube in the water tank to heat the water by convection and conduction.

In some instances, it may be desirable for the gas valve to modulate the outlet gas flow in response to a change in the heat-demand or temperature response from the gas-fired appliance. With respect to some gas-fired furnaces, for example, it may be desirable to modulate the gas flow fed to the furnace between a number of different positions to increase or decrease fuel combustion within the burner box based on factors such as air-flow, heat-demand, internal temperature, etc. In some applications, for example, it may be desirable for the gas valve to have fixed low pressure and high pressure limits independent of the appliance size or type of installation, and irrespective of pressure variations at the gas valve inlet. The ability to better control the gas output from the gas valve may be beneficial to increase the efficiency of the appliance to reduce or eliminate energy waste and to prolong the life of the appliance.

SUMMARY

The present invention pertains to modulating gas valves and systems for modulating gas flow to gas-fired appliances. A modulating gas valve in accordance with an illustrative embodiment can include a valve body, at least one main valve in fluid communication with a main gas conduit of the valve body, a number of pressure regulators for regulating the gas pressure outputted from the main valve or valves between a first gas pressure and a second gas pressure, and a modulator or switch adapted to variably modulate the gas outputted by the gas valve between an infinite or discrete number of positions between the first and second gas pressures. The modulating gas valve can be configured as either a pressure-to-open or a pressure-to-close type gas valve, depending on the configuration of the main valve or valves and the pressure regulators. In a pressure-to-open type gas valve, for example, the main valve or valves can each include a resilient biasing element such as spring adapted to bias each main valve in a normally closed position against a valve seat. In some embodiments, other elements such as an on/off valve can be provided to control the gas flow outputted by the gas valve in a desired manner.

In use, the pressure regulators can be adjusted to control the gas pressure diverted through a control gas conduit in fluid communication with the gas inlet and gas outlet. In some embodiments, for example, the gas valve can include multiple pressure regulators, each set at a different gas pressure to limit gas pressure outputted by the gas valve between several set points. In other embodiments, a single pressure regulator capable of setting multiple gas pressure limits can be used to limit gas pressure outputted by the gas valve between several set points. Depending on the configuration of the gas valve, the pressure differential across each main valve can cause the main valve to either open or close, resulting in a change in gas flow outputted by the gas valve. In a pressure-to-open configuration, for example, an increased amount of gas flow diverted through the control gas conduit may result in an increase in differential pressure across the main valve or valves, causing an increase the gas flow outputted from the gas valve.

The pressure regulators can be adjusted and, in some cases, modulated to set high-fire and low-fire set points for controlling the gas flow outputted from the gas valve at a desired rate or within a particular range. In those embodiments where multiple pressure regulators are employed, the pressure regulators can each be connected in parallel with each other via a respective control gas channel in fluid communication with the control gas conduit. In other embodiments employing multiple pressure regulators, the regulators can be connected in series with each other, and can include a regulator control gas channel in fluid communication with the control gas conduit for diverting gas pressure around one of the pressure regulators. A modulator or switch can be configured to throttle the gas pressure fed to the second regulator in order to adjust the overall pressure diverted around the main valve. In some embodiments, the modulator or switch can comprise a pneumatic or electric switch that can be switched or pulsed on and off at a particular frequency and/or duty cycle in order to variably bypass or disable control gas pressure fed to the second regulator. The frequency and/or duty cycle signal of the modulation can then be varied by a desired amount to control the flow of gas outputted by the main valve at a desired rate or within a particular range.

The amount of throttling provided by the modulator or switch can be manually or automatically adjusted based on feedback signals received from one or more components of the gas-fired appliance and/or from signals received from a controller connected to the gas valve. In some embodiments, for example, the modulator or switch can be configured to receive one or more pneumatic pressure signals from the gas-fired appliance that can be used to vary the amount of throttling provided by the modulator or switch based on the operational state of the appliance. In other embodiments, electrical or mechanical signals from a control unit can be used to vary the amount of throttling provided by the modulator or switch in a desired manner.

By throttling gas pressure with the modulator or switch, the main valve or valves can be actuated between a number of different positions within the range established by the pressure regulators, providing greater control over the gas flow outputted by the gas valve. In those embodiments in which the modulator or switch is variably adjustable between an infinite number of positions, for example, the main valve or valves can be actuated between an infinite number of positions to variably regulate the gas flow outputted by the gas valve. In similar fashion, in those embodiments in which the modulator or switch is variably adjustable between a number of discrete positions and/or an on/off position, the main valve or valves can be actuated between a number of fixed positions to variably regulate the gas flow outputted by the gas valve.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of gas valves and systems are illustrated in the various views, those skilled in the art will recognize that many of the examples provided have suitable alternatives that can be utilized. Moreover, while the gas valves and systems are described with respect to gas-fired furnaces, it should be understood that the gas valves and systems described herein could be applied to the control of other gas-fired appliances, if desired. Other types of gas-fired appliances that can be controlled using the gas valves and systems described herein can include, for example, water heaters, fireplace inserts, gas stoves, gas clothes dryers, gas grills, or any other such device where gas control is desired. While the valve embodiments described are referred to as gas valves or modulating gas valves, it should be understood that the valves described herein could be used in the control of other fluids, either in liquid or gas form.

Figure 1:
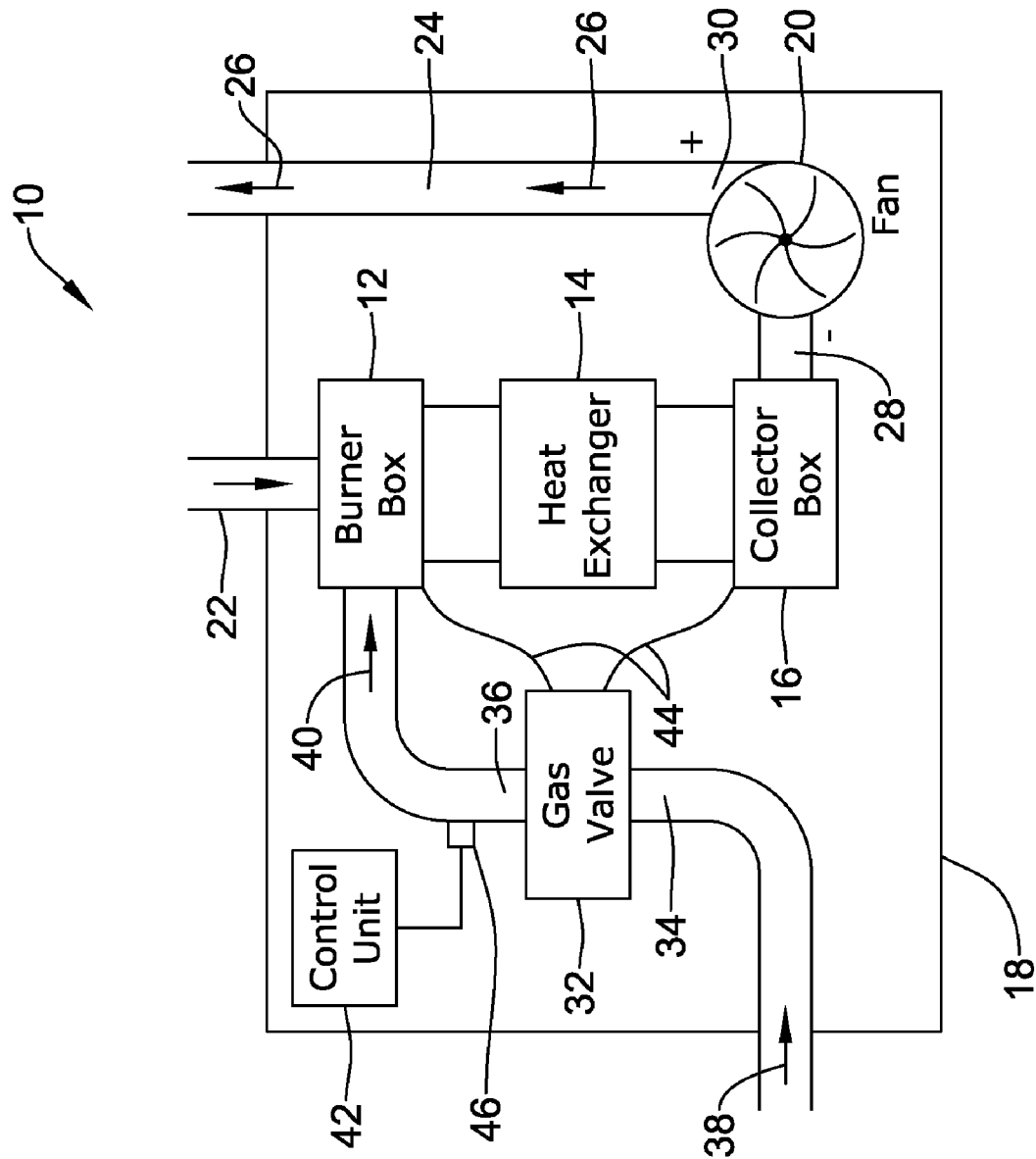
FIG. 1 is a schematic diagram of an illustrative gas-fired furnace employing a modulating gas valve.

Referring now to FIG. 1, an illustrative gas-fired appliance 10 employing a modulating gas valve will now be described. The gas-fired appliance 10, illustratively a gas furnace, can include a burner box 12, a heat exchanger 14, and a collector box 16, each of which can be housed within a furnace housing 18. A fan 20 in fluid communication with the burner box 12, heat exchanger 14, and collector box 16 can be configured to draw in air through an air intake 22, which can then be heated to an elevated temperature within the burner box 12. Heated air within the burner box 12 can then be outputted to the heat exchanger 14 and collector box 16 and then exhausted to a location outside of the building or structure via an exhaust flue 24. In use, the operation of the fan 20 produces a positive airflow in the direction indicated generally by arrow 26, forcing the heated air within the burner box 12 to be discharged through the exhaust flue 24. As indicated generally by the "+" and "−" signs in FIG. 1, the positive airflow 26 produces a change in pressure between the inlet side 28 and outlet side 30 of the fan 20 that can change the air/fuel combustion ratio within the burner box 12.

A modulating gas valve 32 having a gas inlet 34 and a gas outlet 36 can be configured to regulate the supply of gas 38 that is fed to the burner box 12 for combustion. As will be understood in greater detail below, and in some embodiments, the gas valve 32 can be configured to modulate the flow of gas 40 fed to the burner box 12 between a number of different positions using a number of pressure regulators and a modulator or switch. A control unit 42 can be provided in some embodiments to control the operation of the gas valve 32 as well as to control other aspects of the gas furnace 10 including combustion within the burner box 12 and the speed and operation times of the fan 20. The control unit 42 can further include additional functionality for adjusting the pilot flame, sensing the presence of gas outside of the furnace housing 18, sensing the temperature and/or pressure within the burner box 12, shutting-off the gas supply 38 to the gas valve 32, and so forth.

During operation, the flow of gas 40 outputted by the gas valve 32 can be controlled via a number of pneumatic pressure lines 44, which sense changes in air pressure between the burner box 12 and collector box 16. The speed of the fan 20 can be either increased or decreased, as necessary, to change the air pressure of intake air fed to the burner box 12 in order to maintain a desired heat output by the appliance. The pressure change created by the fan speed change can then be sensed by the gas valve via the pneumatic pressure lines 44.

To ensure that the gas pressure does not exceed an upper (i.e. high-fire) limit, a servo regulator or other means for regulating outlet pressure from the gas valve 32 can be provided, which acts to limit the gas flow 40 fed to the burner box 12. In some embodiments, a second regulator can also be provided to set a lower (i.e. low-fire) limit to ensure that a minimum amount of gas is fed to the burner box 12. For example, the second regulator may be employed to prevent gas flow 40 from the gas valve 32 unless a sufficient air pressure is maintained at the burner box 12 to ensure proper combustion at the burner elements. Typically, there exists an offset amount in which the gas valve 32 does not open until a minimum change in pressure exists at the burner box 12. Such offset, for example, may be used to halt combustion when an insufficient amount of gas flow 40 is delivered to the burner box 12. Other devices such as a pressure switch and/or sensor 46 may be provided in the path of the gas valve 32 to sense, and if necessary, shut-off the gas valve 32 if the gas flow 40 is not maintained at a certain flow rate or within a particular flow range.

Figure 2:
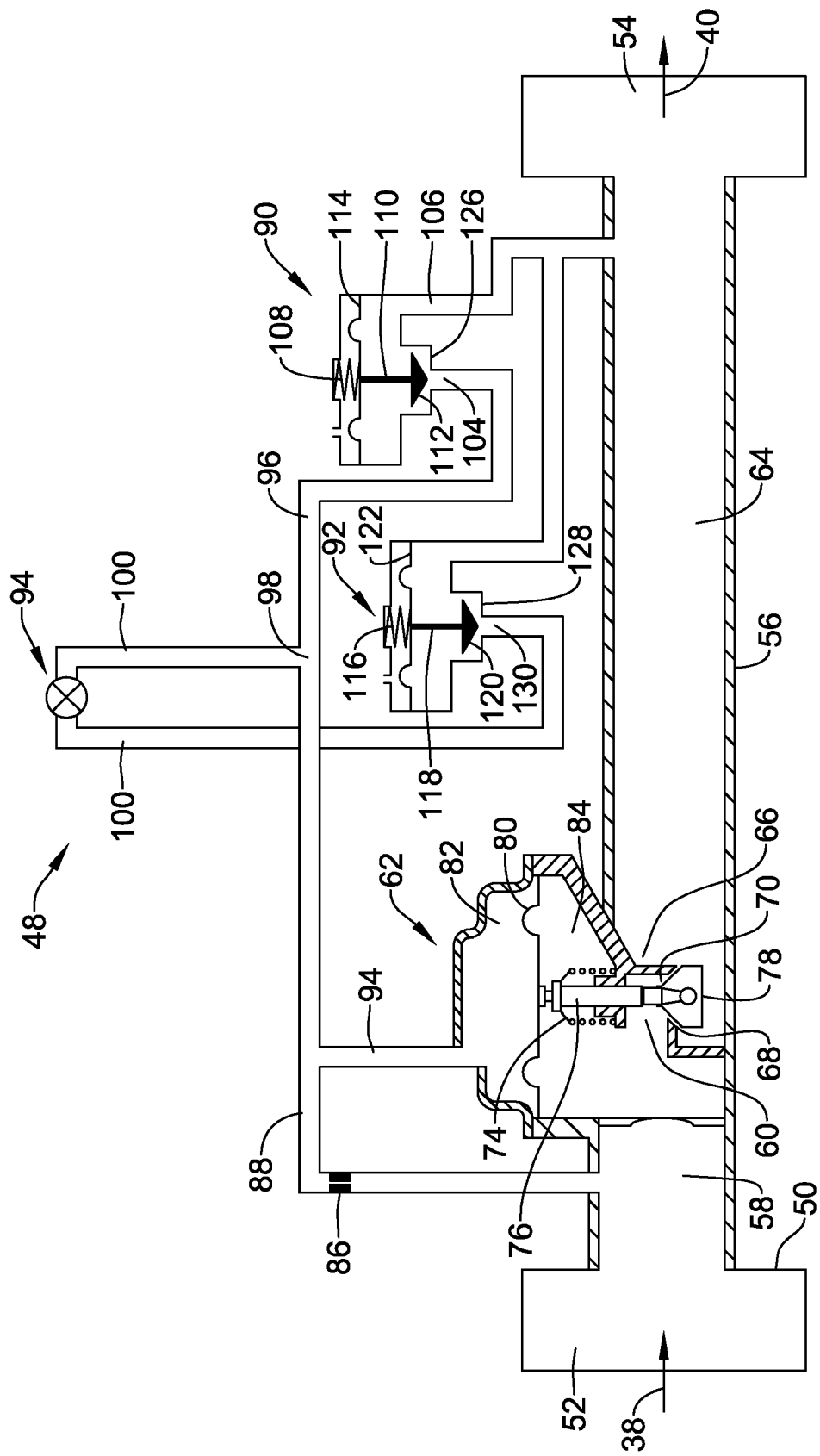
FIG. 2 is a schematic cross-sectional view of a modulating gas valve in accordance with an illustrative embodiment.

FIG. 2 is a schematic cross-sectional view of an illustrative modulating gas valve 48 that can be used in conjunction with a gas-fired appliance such as the gas furnace 10 of FIG. 1. Modulating gas valve 48, illustratively a pressure-to-open type gas valve, can include a valve body 50 having a gas inlet 52, a gas outlet 54, and a main gas conduit 56 connecting the gas inlet 52 and gas outlet 54. In the illustrative embodiment of FIG. 2, the main gas conduit 56 defines a first gas flow chamber 58 in fluid communication with the gas valve inlet 52 and the inlet 60 of a main valve 62. A second gas flow chamber 64 of the main gas conduit 56, in turn, is in fluid communication with the outlet side 66 of the main valve 62 and the gas valve outlet 54. In some embodiments, an on/off valve (not shown) such as a solenoid valve can be provided at the gas valve inlet 52 to shut-off the supply of gas 38 fed into the first flow chamber 58, if desired.

The main valve 62 can be actuated relative to a valve seat 68 within the main gas conduit 56, allowing the main valve 62 to move between a number of different positions for variably regulating the gas flow 40 outputted from the gas valve 48. In an open position depicted generally in FIG. 2, for example, the main valve 62 can be configured to move downwardly away from the valve seat 68, exposing an opening 70 through which the supply of gas 38 entering the first gas flow chamber 58 can be discharged to the gas outlet 54. In some cases, the gas flow 40 outputted from the gas valve 48 can be varied between a high-fire set point and a low-fire set point in order to set upper and lower limits on the gas outputted to the gas-fired appliance. With respect to the illustrative gas furnace 10 depicted in FIG. 1, for example, the gas flow 40 fed to the burner box 12 can be variably adjusted based on the differential air pressure produced by the fan 20, set point values established by the appliance manufacturer and/or by industry standard, as well as other factors. With respect to other gas-fired appliances, the gas flow 40 outputted by the gas valve 48 can be regulated based on other factors such as temperature, pressure, heat-demand, etc.

In some embodiments, the main valve 62 may comprise a diaphragm-type valve including a resilient biasing member 74 such as a spring operatively coupled to a valve stem 76 and stopper 78. A diaphragm 80 disposed within the interior of the valve 62 and supported by the valve stem 76 may define a first chamber 82 and a second chamber 84. During operation, a sufficient pressure differential across the diaphragm 80 due to different gas pressures within the first chamber 82 and second chamber 84 can be configured to overcome the spring force provided by the resilient biasing member 74, causing the stopper 78 to move away from the valve seat 68 and open the main valve 62.

The configuration of the main valve 62 may vary depending on whether the gas valve is a pressure-to-open or a pressure-to-close type valve. In a pressure-to-open configuration illustrated in FIG. 2, the resilient biasing member 74 can be configured to bias the valve stopper 78 against the valve seat 68 such that the main valve 62 is normally closed in the absence of a pressure exerted on the diagram 80 overcoming the spring force provided by the member 74. While a resilient biasing member 74 is shown in the illustrative embodiment depicted, it should be understood that such member 74 is not required in all embodiments. In some embodiments, for example, the diaphragm 80 may itself provide a sufficient closing force to the close the main valve 62.

A supply orifice 86 in fluid communication with the first flow chamber 58 of the main gas conduit 56 can be configured to supply gas through a control gas conduit 88 used to supply gas pressure to the first chamber 82 of the main valve 62, and that can be used to control gas pressure through a high-fire pressure regulator 90, a low-fire pressure regulator 92, and a modulator 94. The control gas conduit 88 may supply gas pressure to the first chamber 82 of the main valve 62 via a valve inlet conduit 94. The control gas conduit 88 may further branch into a first control gas channel 96 for diverting gas pressure through the high-fire pressure regulator 90 and to the second flow chamber 64 located downstream of the main valve 62. At juncture 98, the control gas conduit 88 may further branch into a second control gas channel 100 in parallel with the first control gas channel 96 for diverting gas pressure through the modulator 94 and low-fire pressure regulator 92 and to the second flow chamber 64.

The high-fire and low-fire pressure regulators 90,92 can each comprise a diaphragm-type regulator valve adjustable between an infinite or discrete number of positions, either manually or with the aid of a servo motor or other suitable drive mechanism. In some embodiments, for example, the high-fire pressure regulator 90 can include a spring 108 operatively coupled to a valve stem 110, stopper 112, and a diaphragm 114. In similar fashion, the low-fire pressure regulator 92 can include a spring 116 operatively coupled to a valve stem 118, stopper 120, and diaphragm 122. The springs 108,116 for each pressure regulator 90,92 can be configured to exert a biasing force on the valve stem 110,118, causing the stopper 112,120 to normally engage a valve seat 126,128. The biasing force provided by the springs 108,116 against the diaphragms 114,122 can be adjusted, and in some cases modulated, allowing the upper and lower pressure set point limits to be varied. While diaphragm-type regulator valves are specifically depicted, it should be understood that other types of regulator valves may be employed to regulate gas pressure. In a modulating-type regulator, for example, the pressure regulator may include a servo motor or other means for modulating the pressure set point within a particular pressure range, as desired.

In the illustrative embodiment of FIG. 2, the high-fire pressure regulator 90 and low-fire pressure regulator 92 operate in parallel with each other such that, when gas pressure is provided to each regulator 90,92, gas pressure within the control gas conduit 88 is diverted through both pressure regulators 90,92 to the second flow chamber 64 of the main gas conduit 56. In such configuration, the pressure within the second flow chamber 64 is governed by the low-fire set point provided by the low-fire pressure regulator 92, which is typically set to provide a minimum gas pressure to the appliance. By way of example and not limitation, the low-fire pressure regulator 92 can be configured to limit gas pressure ($P_a$) to the appliance at 0.6 inch ($H_2O$) whereas the high-fire pressure regulator 90 can be configured to limit gas pressure $P_a$ to the appliance at 3.5 inch ($H_2O$). The specific gas pressures set by the high-fire and low-fire pressure regulators 90,92 will typically vary, however, depending on the mechanical characteristics of the main valve 62, the high and low set point values established by the manufacturer of the gas-fired appliance, the desired range of gas flow to the gas-fired appliance, as well as other factors.

As can be further seen in FIG. 2, the modulator 94 can be placed in series with the inlet side 130 of the low-fire pressure regulator 92 to throttle gas pressure supplied to the regulator 92 and thus vary the gas pressure bypassed into the second flow chamber 64. The modulator 94 can comprise any suitable device capable of throttling the gas pressure to the low-fire pressure regulator 92. Examples of suitable means for modulating gas pressure can include, but are not limited to, throttling valves, solenoid valves, linear motion valves, diaphragm valves, control valves, plug valves, needle valves, and butterfly valves. In some embodiments, the modulator 94 can be configured to operate as an on/off valve for operating the gas valve 48 between the two positions set by the high-fire pressure regulator 90 and low-fire pressure regulator 92. In other embodiments, the modulator 94 can be adjusted between an infinite number of positions to operate the gas valve 48 between an infinite number of positions between the high-fire and low-fire set points established by the pressure regulators 90,92. In yet other embodiments, the modulator 94 can be adjusted between two or more finite or discrete positions to operate the gas valve 48 at multiple fixed positions between the high-fire and low-fire set points established by the pressure regulators 90,92. While the modulator 94 in FIG. 2 is shown in series with the inlet side 130 of the low-fire pressure regulator 92, it should be understood that the modulator 94 could be placed downstream of the low-fire pressure regulator 92 to throttle gas pressure from the regulator 92, if desired.

In use, the modulator 94 can be configured to operate in a fixed position, or, alternatively, can include a means for adjusting the amount of modulation provided. In the latter case, for example, the modulator 94 can include a knob, handle, set-screw, servo-motor, or other suitable means for adjusting the modulation. In some embodiments, the modulator 94 can be controlled automatically via signals received from a controller tasked to control the gas valve 48. With respect to the illustrative gas furnace 10 depicted in FIG. 1, for example, control of the modulator 92 can be accomplished via signals received from the control unit 42 and/or from the burner box 12, fan 20, or other furnace component.

Figure 3:
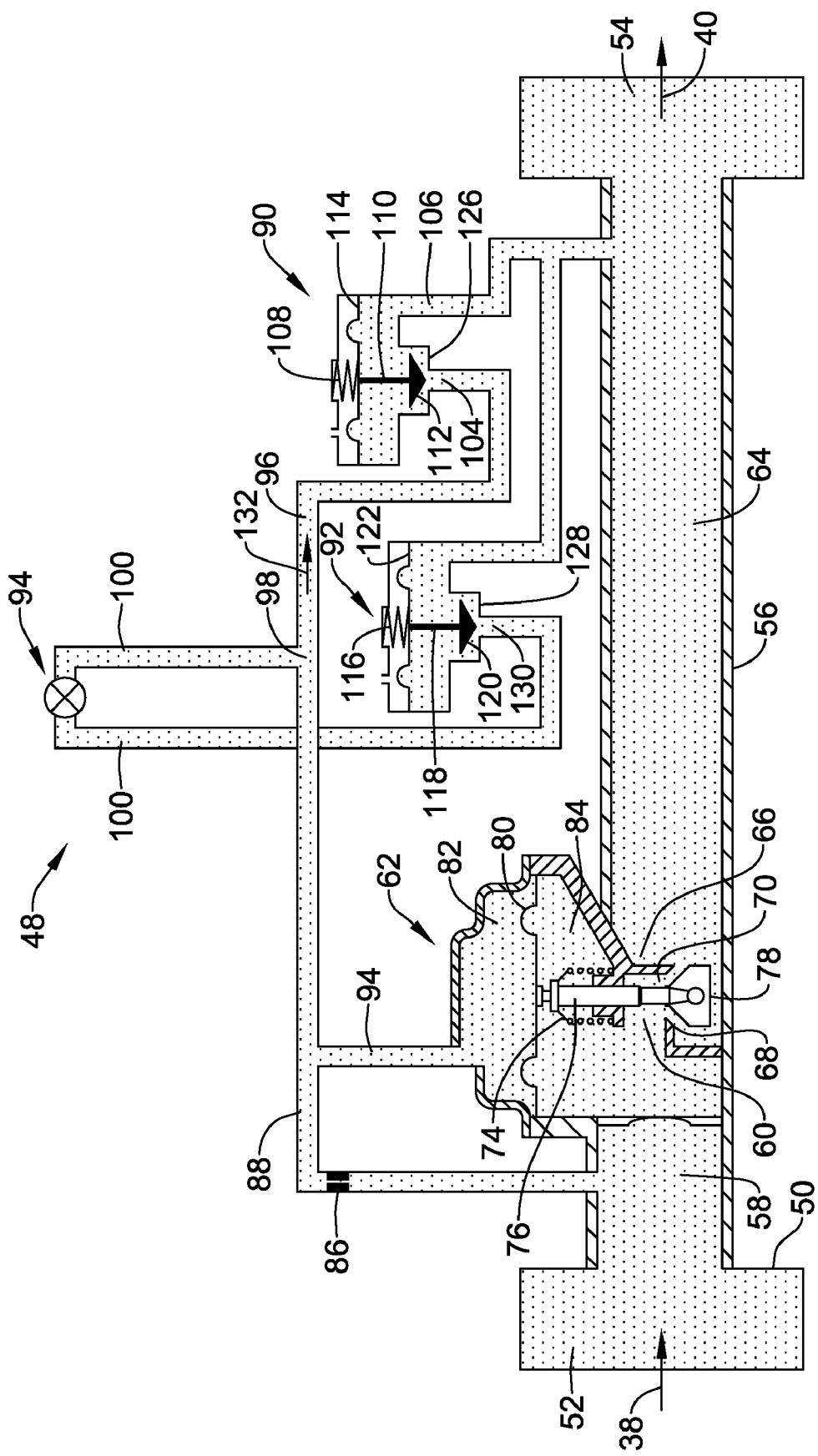
FIG. 3 is a schematic cross-sectional view showing the modulating gas valve of FIG. 2 in a high-fire mode of operation.

The operation of the modulating gas valve 48 will now be described with respect to FIGS. 3-5, which show the gas valve 48 in several different modes of operation based on the amount of throttling provided by the modulator 94. In a high-fire mode of operation depicted in a first view in FIG. 3, the modulator 94 is shown in a fully closed position, causing gas pressure within the control gas conduit to flow into only the first control gas channel 96 through the high-fire pressure regulator 90, as indicated generally by arrow 132. In this position, the relatively high set point established by the high-fire pressure regulator 90 permits a relatively large amount of gas to be discharged into the second flow chamber 64 of the main gas conduit 56. This relatively large amount of gas pressure discharged into the second flow chamber 64 acts to increase the pressure within the first chamber 82 of the main valve 62, thus counteracting the spring force exerted on the diaphragm 80 by the resilient biasing member 74. As a result, the main valve 62 opens to permit gas flow 40 at the rate set by the high-fire pressure regulator 90.

Figure 4:
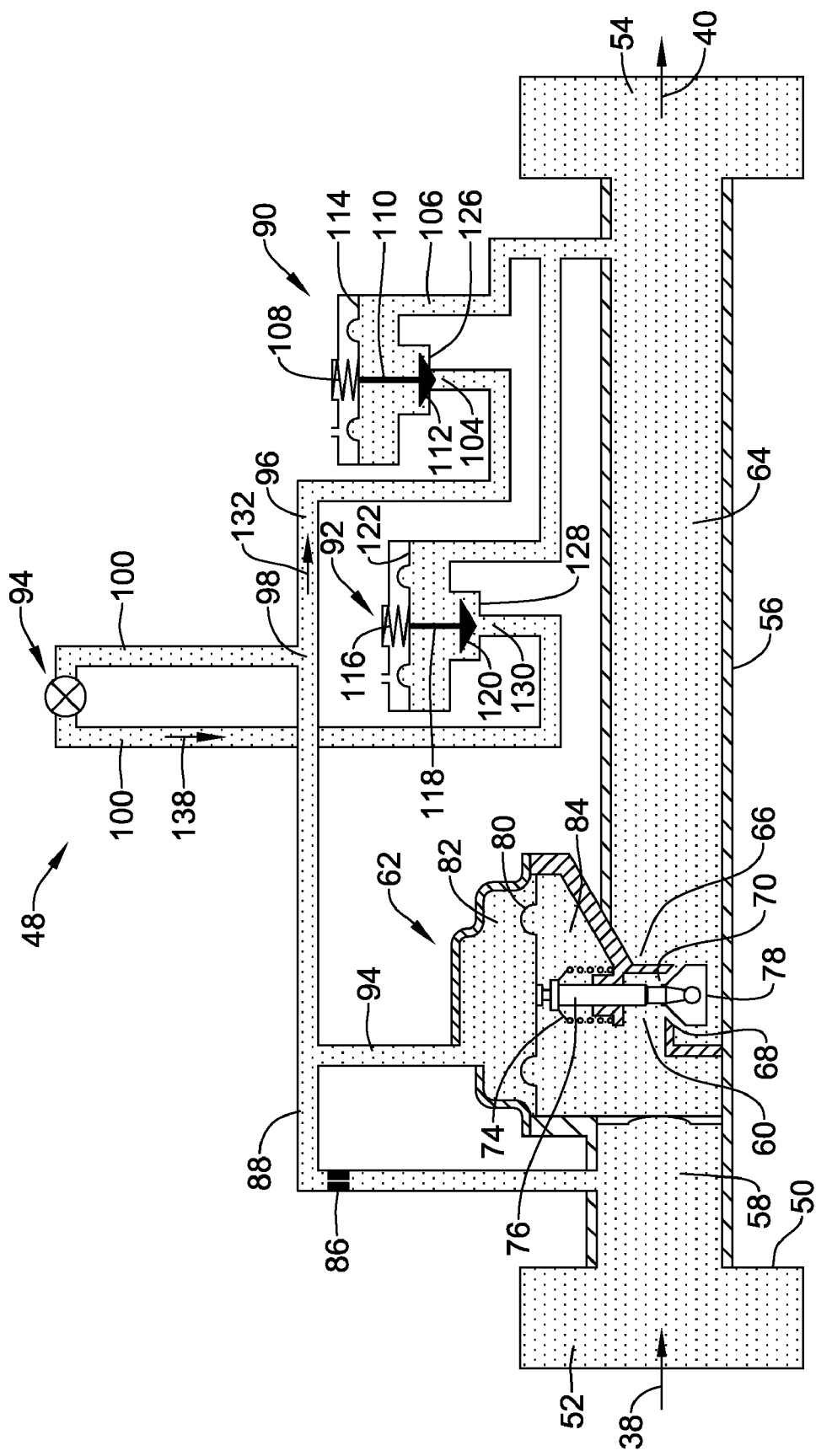
FIG. 4 is schematic cross-sectional view showing the modulating gas valve of FIG. 2 in a second mode of operation.

FIG. 4 is a schematic cross-sectional view showing the modulating gas valve 48 of FIG. 2 in a second operating mode with the modulator 94 set at an intermediate position to throttle gas pressure fed to the low-fire pressure regulator 92. With the modulator 94 at least partially open, gas pressure within the control gas conduit 88 is throttled at a lower pressure through the low-fire pressure regulator 92 to the second flow chamber 64, as indicated generally by arrow 138. Because the first and second control gas channels 96,100 are in parallel with each other, and since the modulated gas pressure outputted by the low-fire pressure regulator 92 is less than the pressure set by the high-fire pressure regulator 92, the overall pressure bypassed from the control gas conduit 88 into the second flow chamber 64 is less than that described above with respect to FIG. 3. This reduced amount of gas bypassed into the second chamber 64 decreases the pressure differential across the main valve 62, causing the valve 62 to output gas flow 40 at a rate lower than that set by the high-fire pressure regulator 90 but above the low-fire set point limit set by the low-fire pressure regulator 92.

Figure 5:
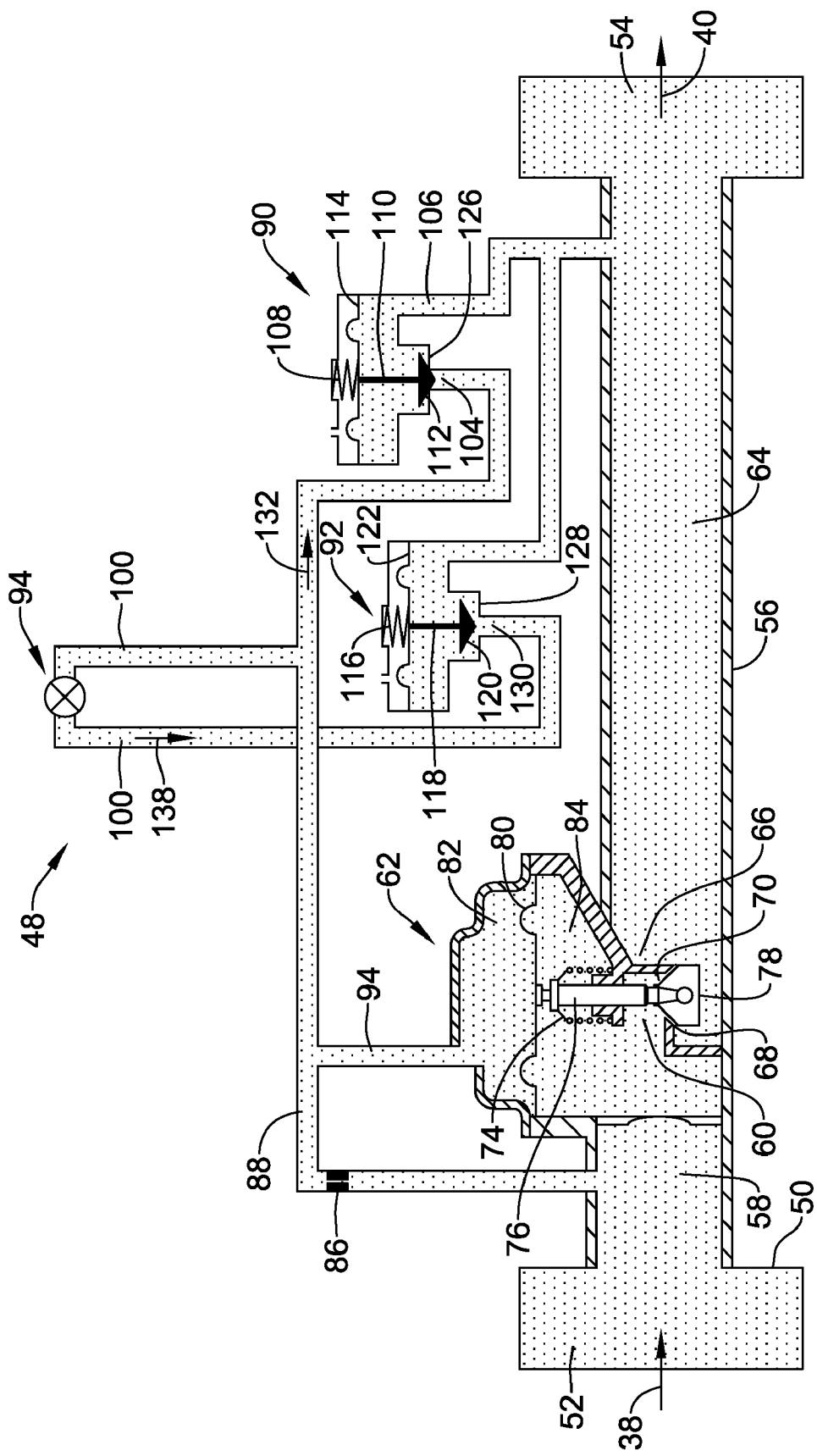
FIG. 5 is schematic cross-sectional view showing the modulating gas valve of FIG. 2 in a low-fire mode of operation.

FIG. 5 is a schematic cross-sectional view showing the modulating gas valve 48 of FIG. 2 in a low-fire operating mode with the modulator 94 set in a fully open position. With the modulator 94 fully open, the gas pressure fed to the low-fire pressure regulator 92 is substantially similar to the gas pressure provided to the high-fire regulator 90, as indicated generally by arrow 138, and no throttling occurs. In this mode, the gas pressure set point set by the low-fire pressure regulator 92 controls the gas pressure bypassed from the control gas conduit 88 into the second flow chamber 64, causing a minimum amount of gas to be relieved within the first chamber 80 of the main valve 62. Consequently, the main valve 62 outputs gas flow 40 at the rate set by the low-fire pressure regulator 92.

By throttling the gas pressure at different rates via the modulator 94, the main valve 62 can be actuated between any number of different positions within the range established by the high-fire and low-fire pressure regulators 90,92. In those embodiments in which the modulator 94 is adjustable between an infinite number of positions, for example, the main valve 62 can be actuated between an infinite number of positions to variably regulate the gas flow 40 outputted from the gas valve 48 within the range established by the high-fire and low-fire pressure regulators 90,92. In similar fashion, in those embodiments in which the modulator 94 is adjustable between a number of finite or discrete positions and/or an on/off position, the main valve 62 can be actuated between a number of fixed positions to variably regulate the gas flow 40 outputted from the gas valve 48 within the range established by the high-fire and low-fire pressure regulators 90,92.

Figure 6:
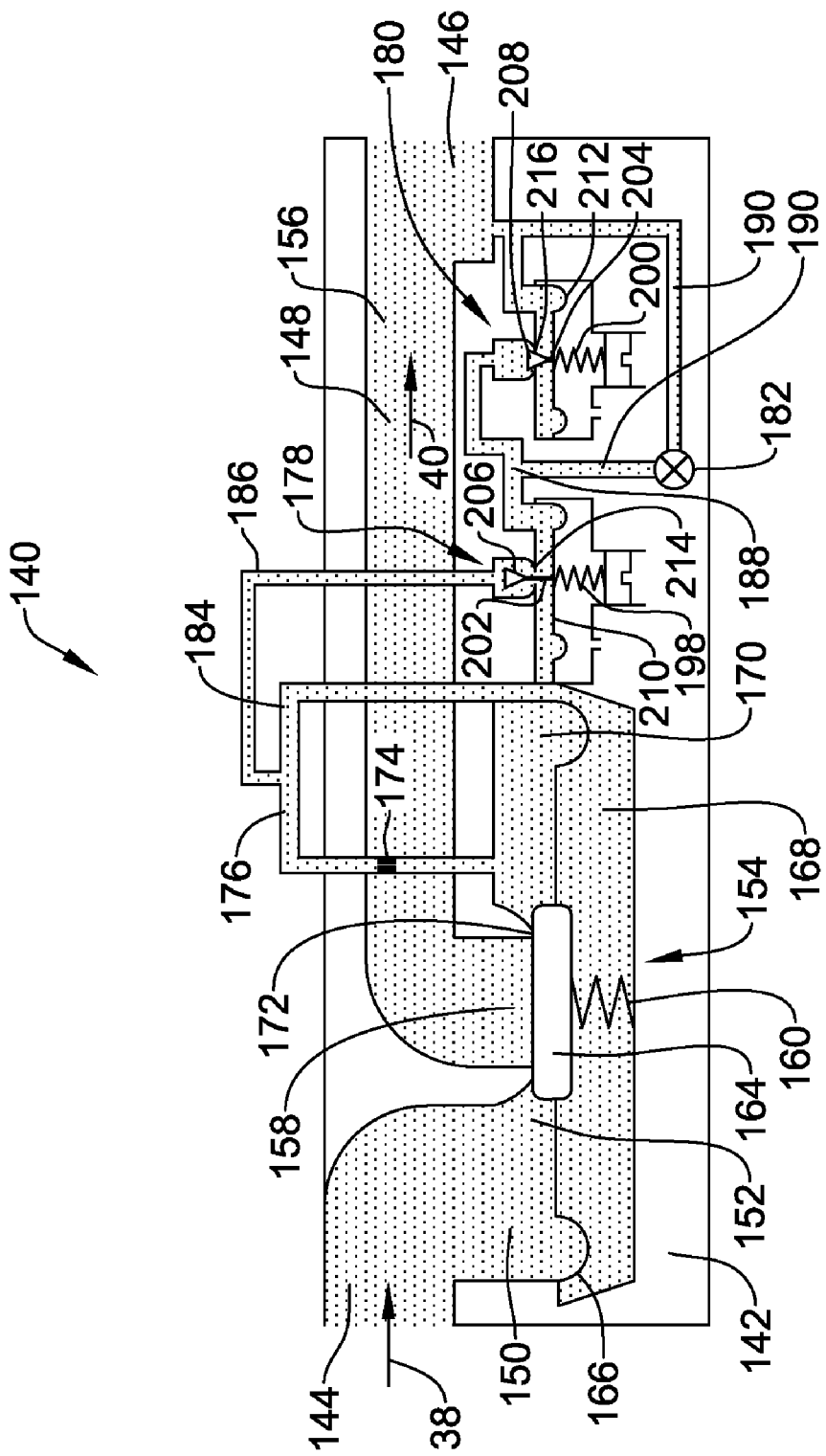
FIG. 6 is a schematic cross-sectional view of a modulating gas valve in accordance with another illustrative embodiment having a pressure-to-close configuration.

FIG. 6 is a schematic cross-sectional view of a modulating gas valve 140 in accordance with another illustrative embodiment having a pressure-to-close configuration. As shown in FIG. 6, the modulating gas valve 140 can include a valve body 142 having a gas inlet 144, a gas outlet 146, and a main gas conduit 148 connecting the gas inlet 144 and gas outlet 146. The main gas conduit 148 may define a first flow chamber 150 in fluid communication with the gas valve inlet 144 and the inlet 152 of a main valve 154. A second gas flow chamber 156 of the main gas conduit 148, in turn, is in fluid communication with the outlet side 158 of the main valve 154 and the gas valve outlet 146. In some embodiments, an on/off valve such as a solenoid valve may be provided at the gas valve inlet 144 to shut-off the supply of gas 38 fed into the first flow chamber 150.

The main valve 154 can include a resilient biasing member 160 such as a spring operatively coupled to a stopper 164. A diaphragm 166 disposed within the interior of the valve 154 may define a first chamber 168 and a second chamber 170. In the pressure-to-close configuration of FIG. 6, the resilient biasing member 60 can be configured to bias the stopper 164 away from a valve seat 172 such that the main valve 154 is normally open in the absence of a negative pressure within the first valve chamber 168.

A supply orifice 174 in fluid communication with the first flow chamber 150 of the main gas conduit 148 can be configured to supply gas through a control gas conduit 176 that can be used to supply gas pressure to the first chamber 168 of the main valve 154, and that can be used to bypass gas pressure through a high-fire pressure regulator 178, a low-fire pressure regulator 180, and a modulator 182. The control gas conduit 176 may supply gas pressure to the first chamber 168 via a valve inlet conduit 184. The control gas conduit 176 may further branch into a control gas channel 186 for diverting gas pressure through the high-fire pressure regulator 178 and, in some cases, the low-fire pressure regulator 180, which is disposed in series with the high-fire pressure regulator 178. At the outlet side 188 of the high-fire pressure regulator 178, the control gas channel 186 may further branch into a regulator control gas channel 190, which can be used to divert control gas pressure around the low-fire pressure regulator 180 to the second flow chamber 156.

The high-fire and low-fire pressure regulators 178,180 can each comprise a diaphragm-type regulator valve that can be adjusted, and in some cases modulated, between an infinite or discrete number of positions, similar to that described above with respect to the illustrative embodiment of FIG. 2. In some embodiments, for example, the high-fire and low-fire pressure regulators 178,180 can each include a respective spring 198,200 operatively coupled to a valve stem 202,204, stopper 206,208, and diaphragm 210,212, as shown. In a pressure-to-close configuration depicted in FIG. 6, the springs 198,200 for each pressure regulator 178,180 can be configured to exert a biasing force upwardly on the valve stems 202,204, causing the stoppers 206,208 to be biased in a normally open position away from a corresponding valve seat 214,216. The biasing force provided by the springs 198,200 against the diaphragms 210,212 can be adjusted and/or modulated, allowing the upper and lower pressure set point limits to be varied.

The pressure regulators 178,180 and modulator 182 can be controlled in a manner similar to that described above with respect to the embodiment of FIG. 2 to modulate the gas flow 40 outputted by the gas valve 140 between a number of different positions. In a pressure-to-close configuration, however, the set point established by the low-fire pressure regulator 180 normally controls the gas pressure bypassed through the control gas conduit 176 into the second flow chamber 156 when both pressure regulators 178,180 are enabled. Modulation of the gas pressure is thus accomplished by modulating the control gas diverted through the regulator control gas channel 190 via the modulator 182. Thus, when the modulator 182 is fully open, gas pressure is diverted around the low-fire pressure regulator 180, causing the gas valve 140 to output gas flow 40 at the high-fire set point established by the high-fire pressure regulator 178. Conversely, when the modulator 182 is fully closed, gas pressure is fed through the low-fire pressure regulator, causing the gas valve 140 to output gas flow 40 at the low-fire set point established by the low-fire pressure regulator 180. While the low-fire pressure regulator 180 is shown located downstream of the high-fire pressure regulator 178 in FIG. 6, it should be understood that the pressure regulators 178,180 could be arranged in opposite fashion with the low-fire pressure regulator 180 located upstream of the high-fire pressure regulator 178, if desired.

The high-fire and low-fire pressure regulators 178,180 can be manually or automatically adjusted to set the upper and lower gas flow rates to be outputted by the gas valve 140. The biasing spring 198 for the high-fire pressure regulator 178, for example, can be adjusted to set the maximum amount of gas flow 40 to be discharged from the gas valve 140. The biasing spring 200 for the low-fire pressure regulator 180, in turn, can be adjusted to set the minimum amount of gas flow 40 to be discharged from the gas valve 140. By variably modulating the gas flow through the regulator control gas channel 190 via the modulator 182, the gas pressure bypassed from the control gas conduit 176 to the second flow chamber 156 can be varied from the high-fire set point, causing the main valve 154 to move towards the valve seat 172 and reduce the gas flow 40 outputted by the gas valve 140. Conversely, when the gas valve 140 is in a low-fire mode, the gas pressure discharged from the control gas conduit 176 can be varied to transition the gas valve 140 to the high-fire set point, if desired. As with a pressure-to-open configuration, modulation of the gas flow 40 outputted from the gas valve 140 can be accomplished variably between an infinite number of positions, or discretely between a number of finite positions. In the latter case, for example, the gas valve 140 can be modulated between one or more intermediate gas flow settings within the high-fire and low-fire set points established by the pressure regulators 178,180.

Figure 7:
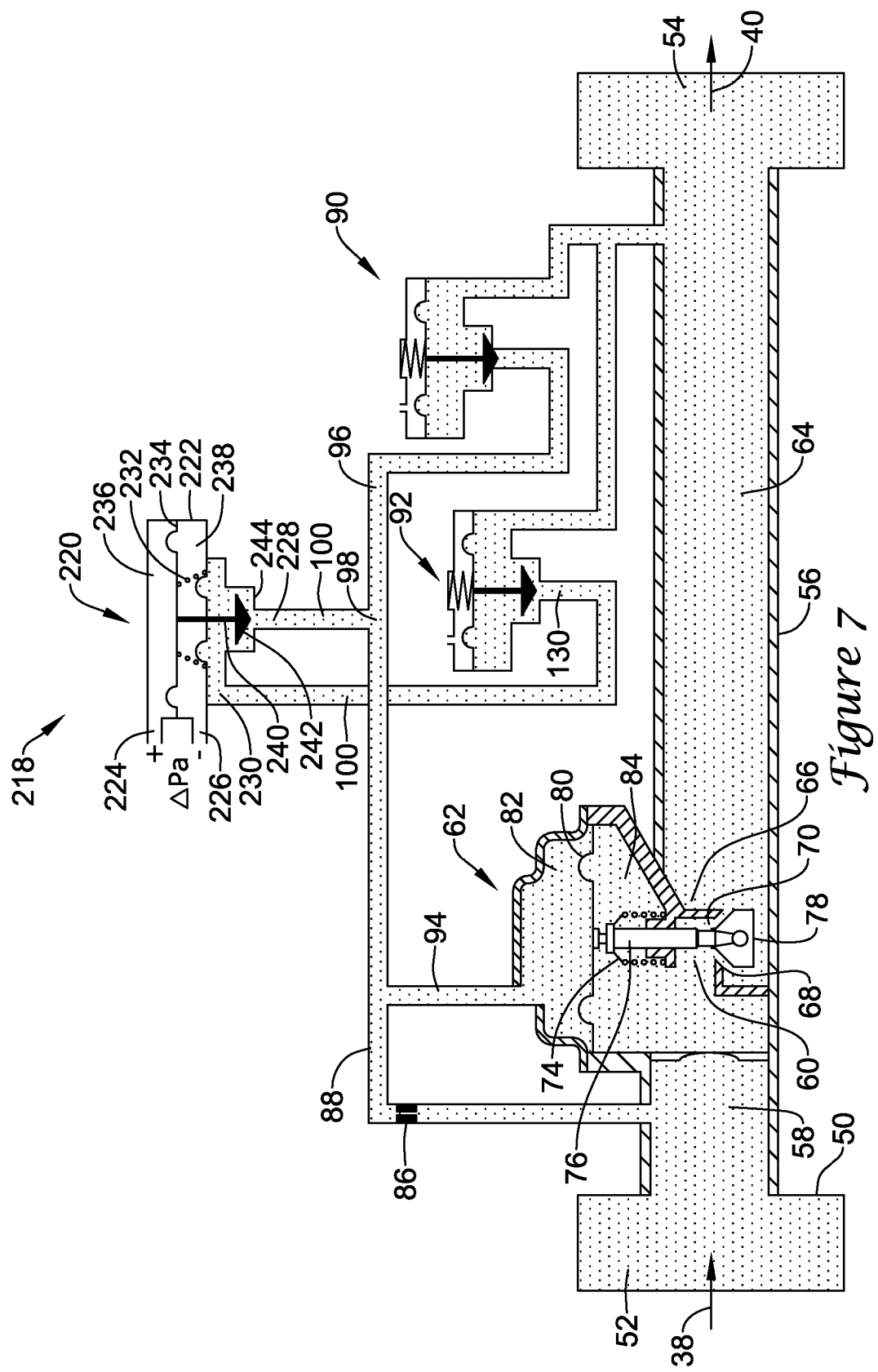
FIG. 7 is a schematic cross-sectional view of a pneumatically modulated gas valve in accordance with an illustrative embodiment.

FIG. 7 is a schematic cross-sectional view of a modulating gas valve 218 in accordance with another illustrative embodiment employing a pneumatic modulator 220 for modulating gas flow outputted by the gas valve 218. Modulating gas valve 218 can be configured similar to gas valve 48 described above with respect to FIGS. 2-5, with like elements labeled in like fashion in the drawings. The modulating gas valve 218 can include, for example, a valve body 50 having a gas inlet 52, a gas outlet 54, and a main gas conduit 56 connecting the gas inlet 52 and gas outlet 54. The modulating gas valve 218 can also include a main valve 62, a high-fire pressure regulator 90, and a low-fire pressure regulator 92, as shown.

In the illustrative embodiment of FIG. 7, the modulator 220 can include a modulator housing 222 having a first pneumatic port 224, a second pneumatic port 226, a gas flow inlet 228, and a gas flow outlet 230. A resilient biasing member 232 such as a spring can be operatively coupled to a diaphragm 234 located within the interior of the modulator housing 222. The diaphragm 234 may define a first chamber 236 in fluid communication with the first pneumatic port 224 of the modulator housing 222, and a second chamber 238 in fluid communication with the second pneumatic port 226 of the modulator housing 222. The diaphragm 234 can be further connected to a valve stem 240 and stopper 242, which in the illustrative embodiment depicted, are biased in a normally open position away from a valve seat 244.

In use, a pneumatic pressure differential ($\Delta P_a$) applied across the first and second pneumatic inlet ports 224,226 creates a concomitant change in pressure between the first and second chambers 236,238, resulting in a change in the net force applied to the diaphragm 234. As the pneumatic pressure differential $\Delta P_a$ increases, for example, a greater downward force is applied to the diaphragm 234, which acts to overcome the upward biasing force applied to the diaphragm 234 via the resilient biasing member 232, causing the valve stem 240 and stopper 242 to move downwardly towards the valve seat 244 to increase throttling within the second control gas channel 100. Conversely, as the pneumatic pressure differential $\Delta P_a$ decreases, the downward force applied to the diaphragm 234 becomes less, causing the valve stem 240 and stopper 242 to move upwardly away from the valve seat 244 to decrease throttling within the second control gas channel 100.

In some embodiments, the operation of the modulator 220 can be based at least in part on feedback signals received from the gas-fired appliance connected to the gas valve 218. With respect to the illustrative gas furnace 10 depicted in FIG. 1, for example, the pneumatic pressure differential $\Delta P_a$ can be based on the pressure differential in the pneumatic pressure lines 44 produced by operation of the fan 20, allowing the modulator 220 to throttle gas pressure based at least in part on the speed of the fan 20. The modulator 220 can be electrically or mechanically controlled, however, using signals received from other furnace components, if desired. Moreover, while the illustrative modulator 220 depicted in FIG. 7 operates using a differential pressure signal via two pneumatic inlet ports 224,226, it should be understood that other embodiments in which the modulator 220 operates using a single pressure signal or multiple pressure signals can also be employed, if desired.

Figure 8:
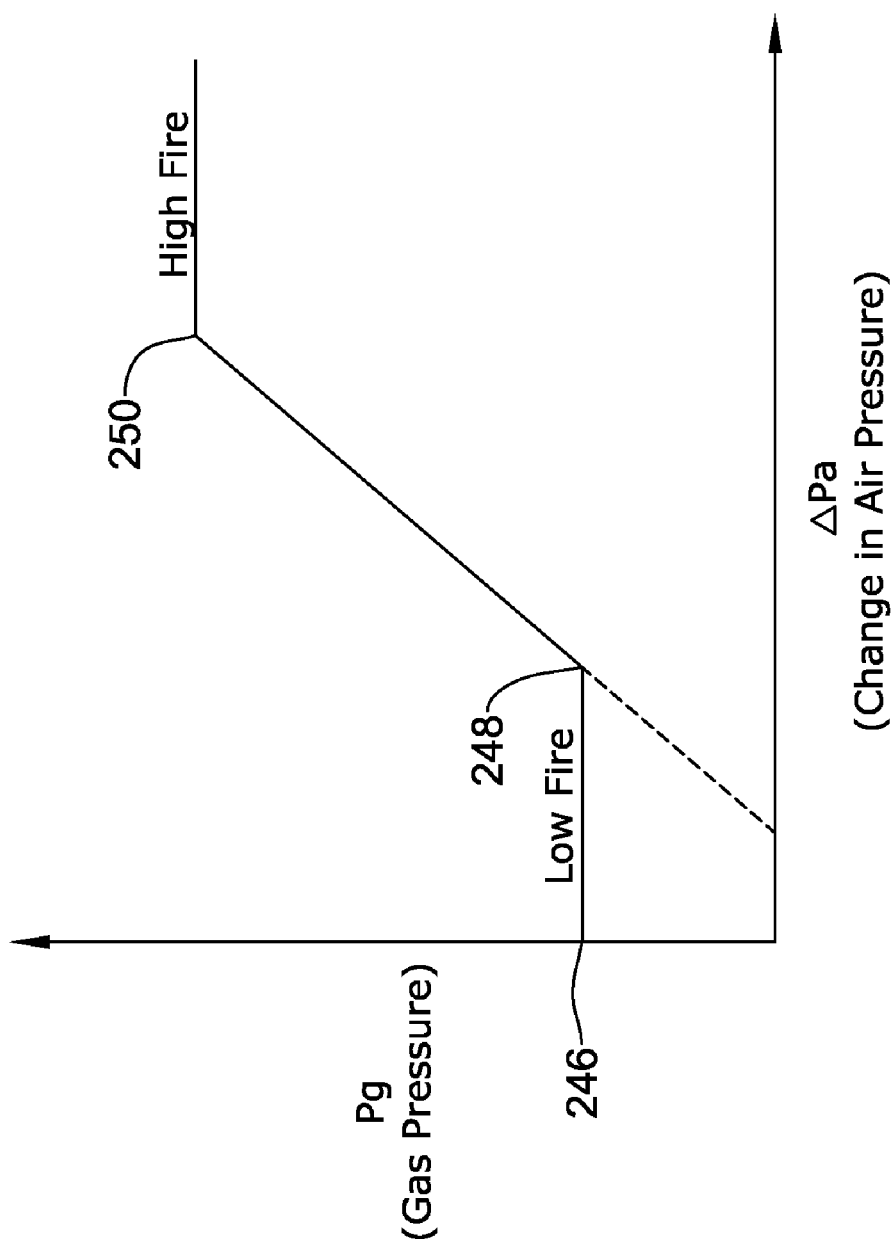
FIG. 8 is a graph showing gas pressure through the modulating gas valve of FIG. 7 as a function of the change in fluid pressure across the pneumatic inlet ports.

FIG. 8 is a graph showing gas pressure through the modulating gas valve 218 of FIG. 7 as a function of the change in fluid pressure across the pneumatic inlet ports 224,226. As shown in FIG. 8, at zero air pressure differential ($\Delta P_a$) at point 246, the stopper 242 for the pneumatic modulator 220 is fully open, allowing gas to flow from the inlet 228 to the outlet 230 of the modulator 220 without throttling. In such position, the low-fire pressure regulator 92 for the gas valve 218 regulates the gas pressure ($P_g$) outputted from the gas valve 218 at a minimum (i.e. low-fire) set point. As the air pressure differential $\Delta P_a$ increases, the differential pressure across the diaphragm 234 increases, causing the diaphragm 234 to exert a downward force to counterbalance the biasing force provided by the resilient biasing member 232.

Figure 9:
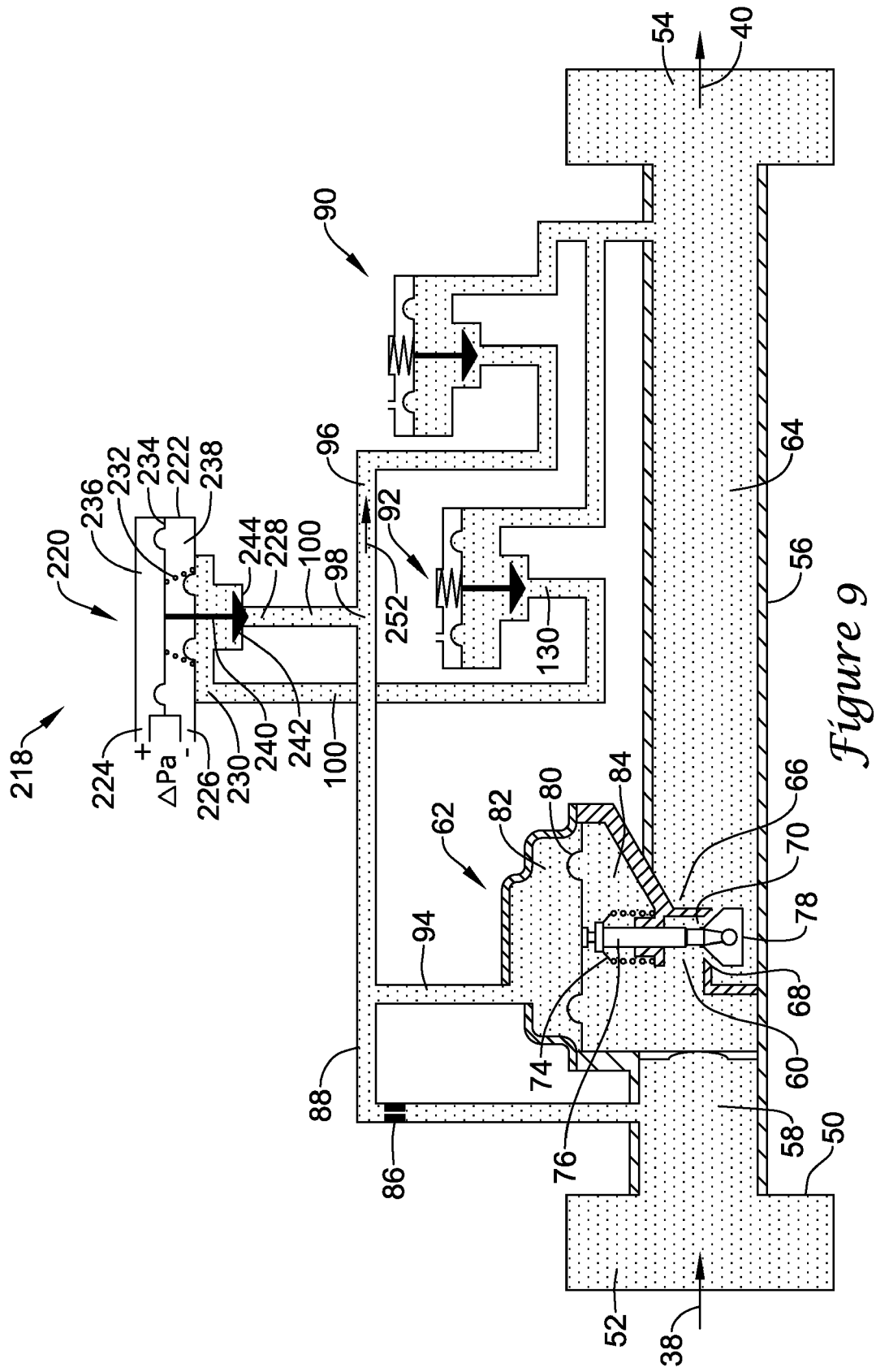
FIG. 9 is a schematic cross-sectional view showing the modulating gas valve of FIG. 7 with the low-fire regulator control gas channel shut-off by the modulator.

As the differential air pressure $\Delta P_a$ increases from zero, the gas pressure $P_g$ outputted by the gas valve 218 remains constant at or near the low-fire set point level until point 248, at which time the valve stem 240 and stopper 242 begin to move sufficiently close to the valve seat 244 to begin to throttle the gas pressure within the second control gas channel 100. From points 248 to 250, as the air pressure differential $\Delta P_a$ increases, the amount of throttling likewise increases, resulting in an increase in gas pressure upstream of the low-fire pressure regulator 92. As this occurs, a transition from low pressure to high pressure occurs, causing the main valve 62 to open more. At point 250, when the valve stopper 242 for the modulator 220 is fully seated against the valve seat 244 and gas pressure to the inlet 130 of the low-fire pressure regulator 92 is shut-off, the high-fire set point established by the high-fire pressure regulator 90 thereafter controls the gas pressure bypassed to the second flow chamber 64 of the main gas conduit 56. As further shown in FIG. 9, for example, when the valve stopper 242 of the modulator 220 is fully seated against the valve seat 244, gas pressure 252 within the control gas conduit 88 is directed through the high-fire pressure regulator 90, causing the gas valve 218 to output gas flow 40 at the set point established by the high-fire pressure regulator 90.

Figure 10:
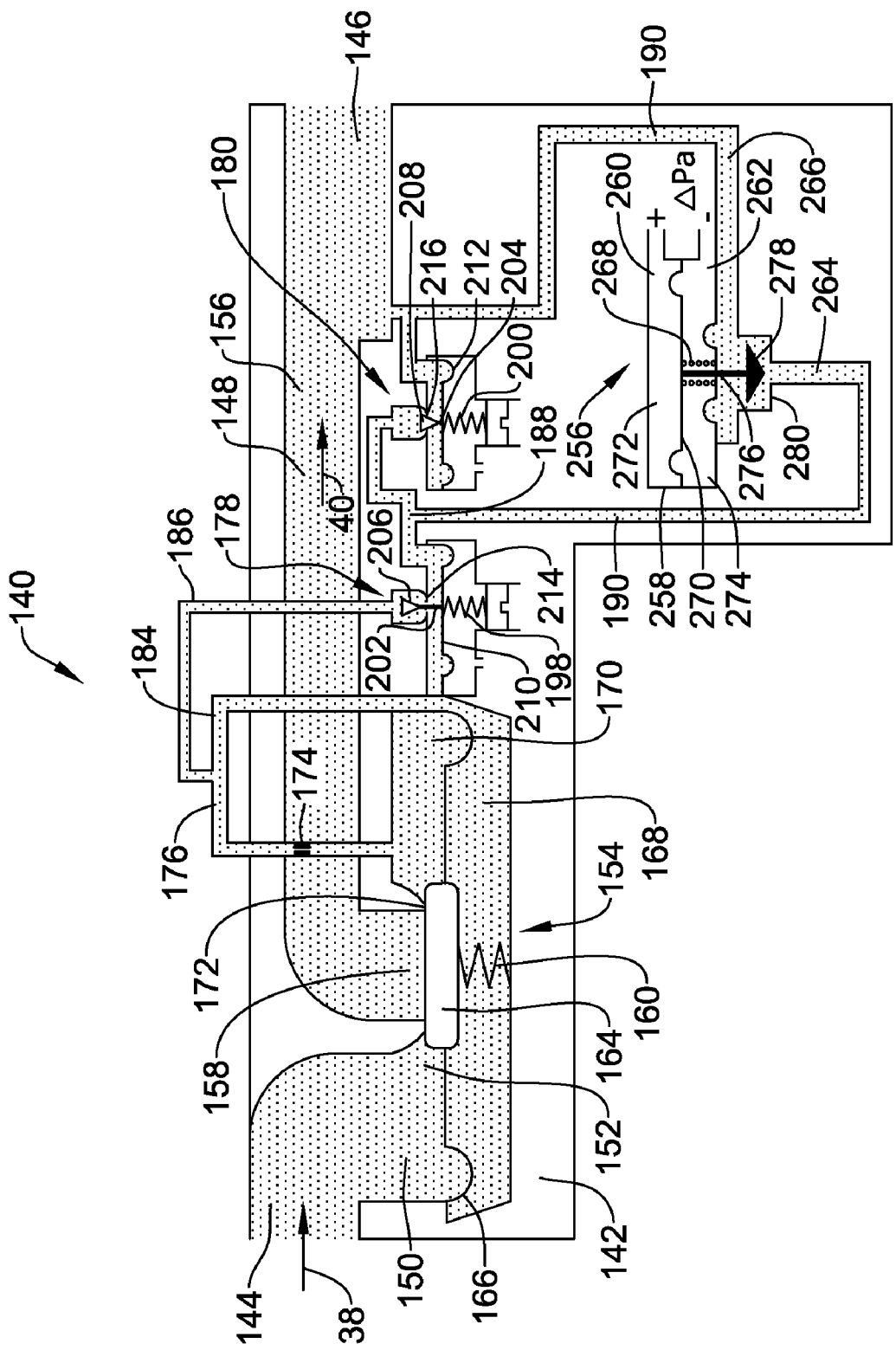
FIG. 10 is a schematic cross-sectional view of a pneumatically modulated gas valve in accordance with an illustrative embodiment having a pressure-to-close configuration.

FIG. 10 is a schematic cross-sectional view of a pneumatically modulated gas valve 254 in accordance with another illustrative embodiment having a pressure-to-close configuration. Modulating gas valve 254 can be configured similar to gas valve 140 described above with respect to FIG. 6, with like elements labeled in like fashion in the drawings. The modulating gas valve 254 can include, for example, a valve body 142 having a gas inlet 144, a gas outlet 146, and a main gas conduit 148 connecting the gas inlet 144 and gas outlet 146. The modulating gas valve 254 can also include a main valve 154, a high-fire pressure regulator 178, and a low-fire pressure regulator 180, as shown.

In the illustrative embodiment of FIG. 10, the modulator 256 can include a housing 258 having a first pneumatic port 260, a second pneumatic port 262, a gas flow inlet 264, and a gas flow outlet 266. A resilient biasing member 268 such as a spring can be operatively coupled to a diaphragm 270 located within the interior of the modulator housing 258. The diaphragm 270 may define a first chamber 272 in fluid communication with the first pneumatic port 260 of the modulator housing 258, and a second chamber 274 in fluid communication with the second pneumatic port 262 of the modulator housing 258. The diaphragm 270 can be further connected to a valve stem 276 and stopper 278, which in the illustrative embodiment depicted, are biased in a normally open position away from a valve seat 280.

The pneumatic modulator 256 can be configured to throttle gas pressure in a manner similar to the modulator 220 described above with respect to FIGS. 7-9. During operation, an increase in the pressure differential $\Delta P_a$ applied to the pneumatic inlet ports 260,262 causes a downward force against the diaphragm 270, which acts to overcome the upward biasing force applied to the diaphragm 270 via the resilient biasing member 268 and move the valve stem 276 and stopper 278 towards the valve seat 280. As with other embodiments herein, the operation of the modulator 256 can be based at least in part on feedback signals received from the gas-fired appliance connected to the gas valve 254 and/or signals received from a controller operatively coupled to the gas valve 254, if desired.

Figure 11:
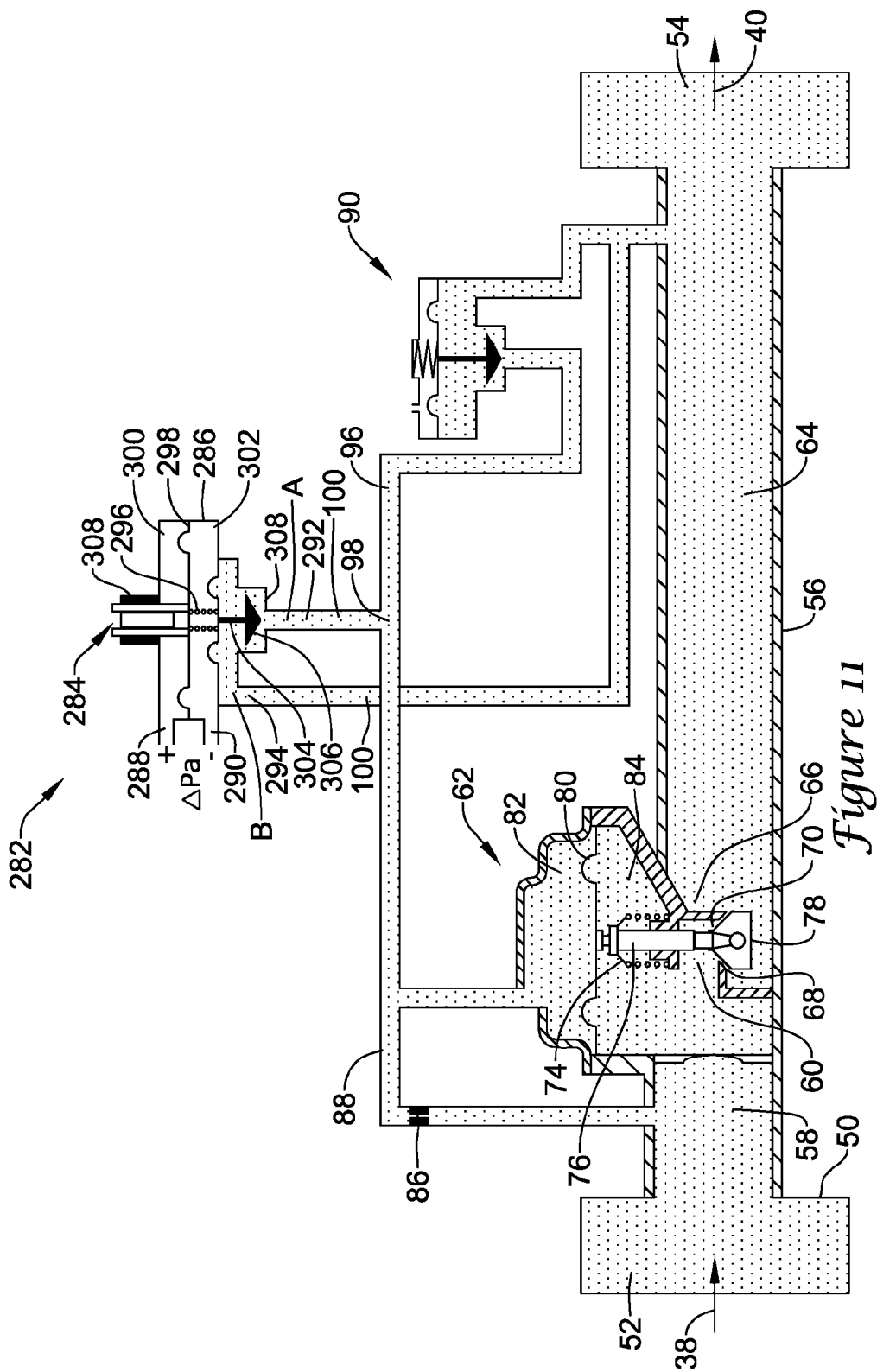
FIG. 11 is a schematic cross-sectional view of a modulating gas valve in accordance with an illustrative embodiment employing a combined modulator/regulator valve.

FIG. 11 is a schematic cross-sectional view of a modulating gas valve 282 in accordance with another illustrative embodiment employing a combined modulator/regulator valve. Modulating gas valve 282, illustratively a pressure-to-open gas valve, can be configured similar to gas valve 48 described above with respect to FIG. 2, with like elements labeled in like fashion in the drawings. In the illustrative embodiment of FIG. 11, however, the low-fire pressure regulator and modulator are shown combined into a single unit 284 that can be used to both set a high-fire set point for limiting the gas flow 40 outputted from the gas valve 282 and to variably throttle gas pressure discharged from the unit 284.

In the illustrative embodiment, the combined modulator/regulator 284 can include a modulator housing 286 having a first pneumatic port 288, a second pneumatic port 290, a gas flow inlet 292, and a gas flow outlet 294. A resilient biasing member 296 such as a spring can be operatively coupled to a diaphragm 298 located within the interior of the housing 286. The diaphragm 298 may define a first chamber 300 in fluid communication with the first pneumatic port 288 of the modulator housing 286, and a second chamber 302 in fluid communication with the second pneumatic port 290 of the modulator housing 286. The diaphragm 298 can be further connected to a valve stem 304 and stopper 306, which in the illustrative embodiment depicted, are biased in a normally open position away from a valve seat 308.

An adjustment mechanism 308 can be provided in some embodiments to adjust the spring force exerted on the diaphragm 298 via the resilient biasing member 296. In some embodiments, the adjustment mechanism 308 can include a knob, handle, set-screw, servo-motor, or other suitable means for adjusting spring pressure. By adjusting the spring force exerted on the diaphragm 298, the gas pressures at which the modulator/regulator 284 opens and closes can be adjusted, and in some cases modulated, to set a desired low-fire set point, similar to that of the low-fire pressure regulator 92 of FIG. 2.

Figure 12:
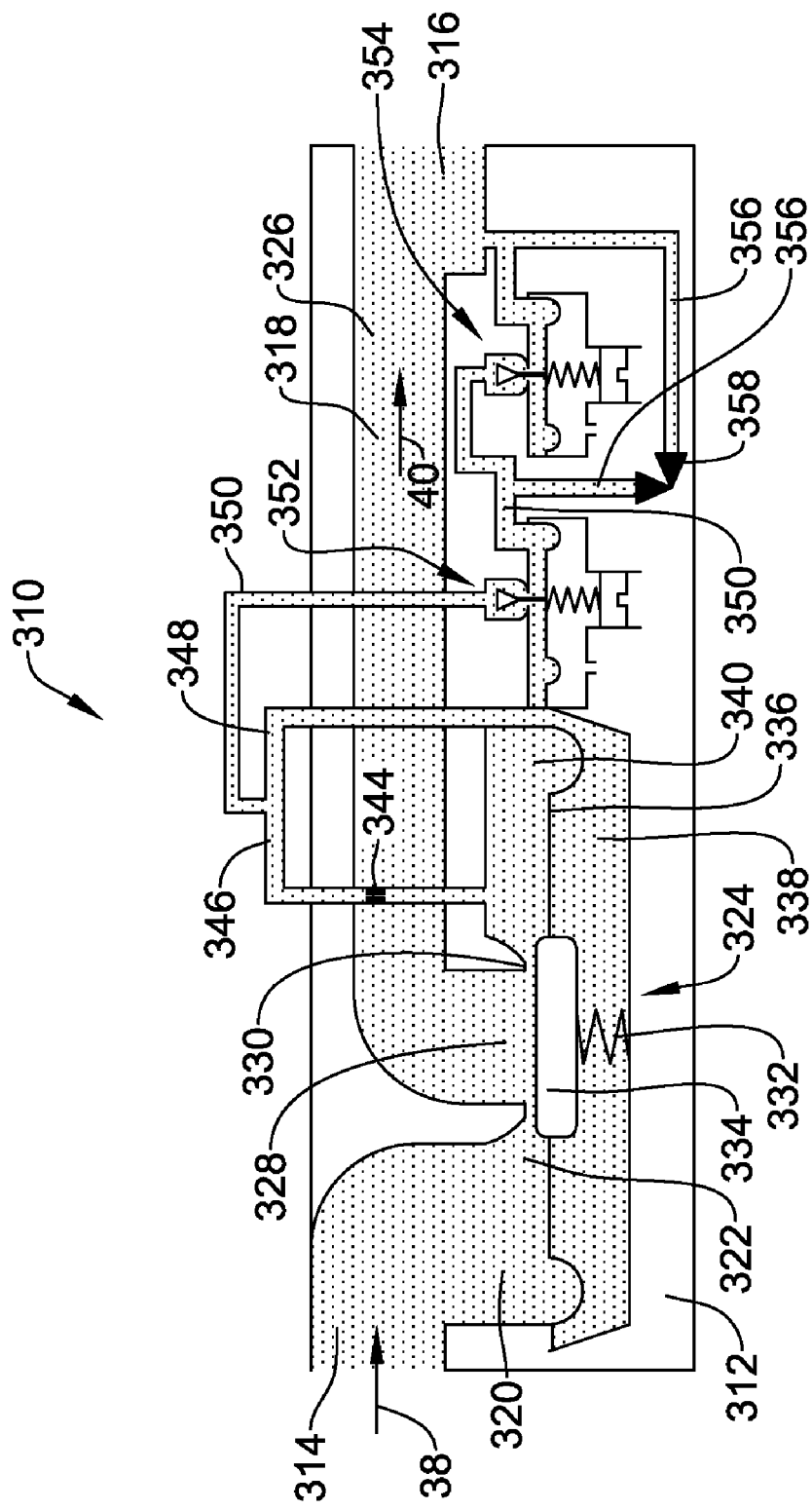
FIG. 12 is a schematic cross-sectional view of a pressure-to-close modulating gas valve employing a pulsed diaphragm switch for variably modulating the gas valve.

FIG. 12 is a schematic cross-sectional view of a modulating gas valve 310 in accordance with an illustrative embodiment employing a pulsed diaphragm switch for variably modulating the gas valve 310. Modulating gas valve 310, illustratively a pressure-to-close type gas valve, can include a valve body 312 having a gas inlet 314, a gas outlet 316, and a main gas conduit 318 connecting the gas inlet 314 and gas outlet 316. In the illustrative embodiment of FIG. 12, the main gas conduit 318 defines a first flow chamber 320 in fluid communication with the gas valve inlet 314 and the inlet 322 of a main valve 324. A second flow chamber 326 of the main gas conduit 318, in turn, is in fluid communication with the outlet side 328 of the main valve 324 and the gas valve outlet 316. In some embodiments, an on/off valve such as a solenoid valve can be provided at the gas valve inlet 314 to shut-off the supply of gas 38 fed into the first flow chamber 320.

The main valve 324 can be actuated relative to a valve seat 330 within the main gas conduit 318, allowing the main valve 324 to move between a number of different positions for variably regulating the gas flow 40 outputted from the gas valve 310. The main valve 324 can comprise, for example, a diaphragm-type valve including a resilient biasing member 332 such as a spring operatively coupled to a stopper 334. A diaphragm 336 disposed within the interior of the valve 324 may define a first chamber 338 and second chamber 340. During operation, a sufficient pressure differential across the diaphragm 336 due to different gas pressures within the first chamber 338 and second chamber 340 can be configured to aid the spring force provided by the resilient biasing member 332, causing the valve stopper 334 to move towards the valve seat 330 to close the main valve 324.

A supply orifice 344 in fluid communication with the first flow chamber 320 of the main gas conduit 318 can be configured to supply gas through a control gas conduit 346 that can be used to supply gas pressure to the first chamber 338 of the main valve 324 via a valve inlet conduit 348, and to a control gas channel 350 for bypassing gas pressure through a high-fire pressure regulator 352 and a low-fire pressure regulator 354 disposed in series with each other. At the outlet side of the high-fire pressure regulator 352, the control gas channel 350 may further branch into a regulator control gas channel 356, which includes a pulsed diaphragm switch 358 that, when activated, can be utilized to divert gas pressure around the low-fire pressure regulator 354 to the second flow chamber 326.

Figure 13:
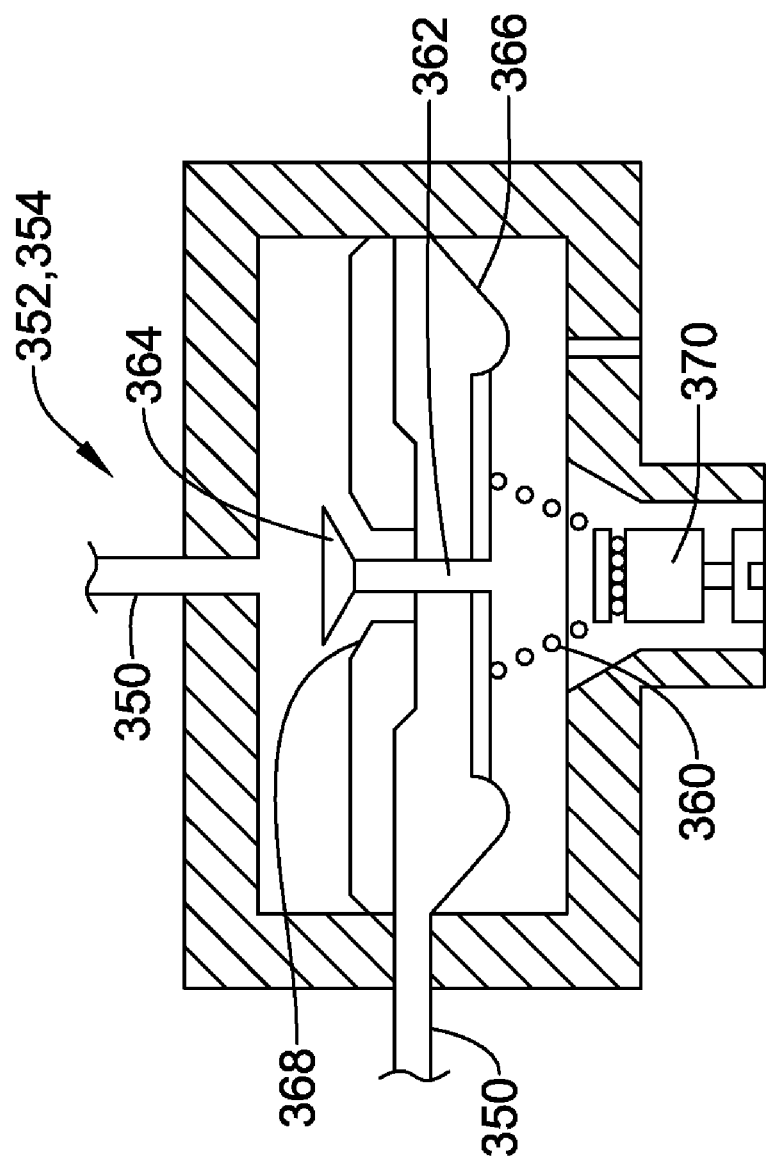
FIG. 13 is an enlarged view of one of the pressure regulators of FIG. 12.

The high-fire and low-fire pressure regulators 352,354 can each comprise a diaphragm-type regulator valve adjustable between an infinite or discrete number of positions, either manually or with the aid of a servo motor or other suitable drive mechanism. In one illustrative embodiment depicted in FIG. 13, for example, each pressure regulator 352,354 can include a spring 360 operatively coupled to a valve stem 362, stopper 364, and diaphragm 366. The spring 360 for each pressure regulator 352,354 can be configured to exert a biasing force on the valve stem 362, causing the stopper 364 to normally engage a valve seat 368. The biasing force provided by the spring 360 can be adjusted using a suitable adjustment means such as a set-screw 370, if desired. A vent orifice 371 open to the atmosphere may be provided in the illustrative embodiment of FIG. 13 as well as other embodiments described herein in order to vent gas to the atmosphere when the diaphragm 366 is inflated by the outlet pressure.

When the pulsed diaphragm switch 358 is inactivated, gas pressure within the control gas conduit 350 is allowed to flow through both the high-fire and low-fire pressure regulators 352,354, causing the main valve 324 to regulate gas flow at the set point value established by the low-fire pressure regulator 354. In this mode of operation, the set point value provided by the low-fire pressure regulator 354 governs the control gas pressure fed to the second flow chamber 326. While the low-fire pressure regulator 354 is shown located downstream of the high-fire pressure regulator 352 in FIG. 12, it should be understood that the pressure regulators 352,354 could be arranged in an opposite fashion with the low-fire pressure regulator 354 located upstream of the high-fire pressure regulator 352, if desired.

Figure 14:
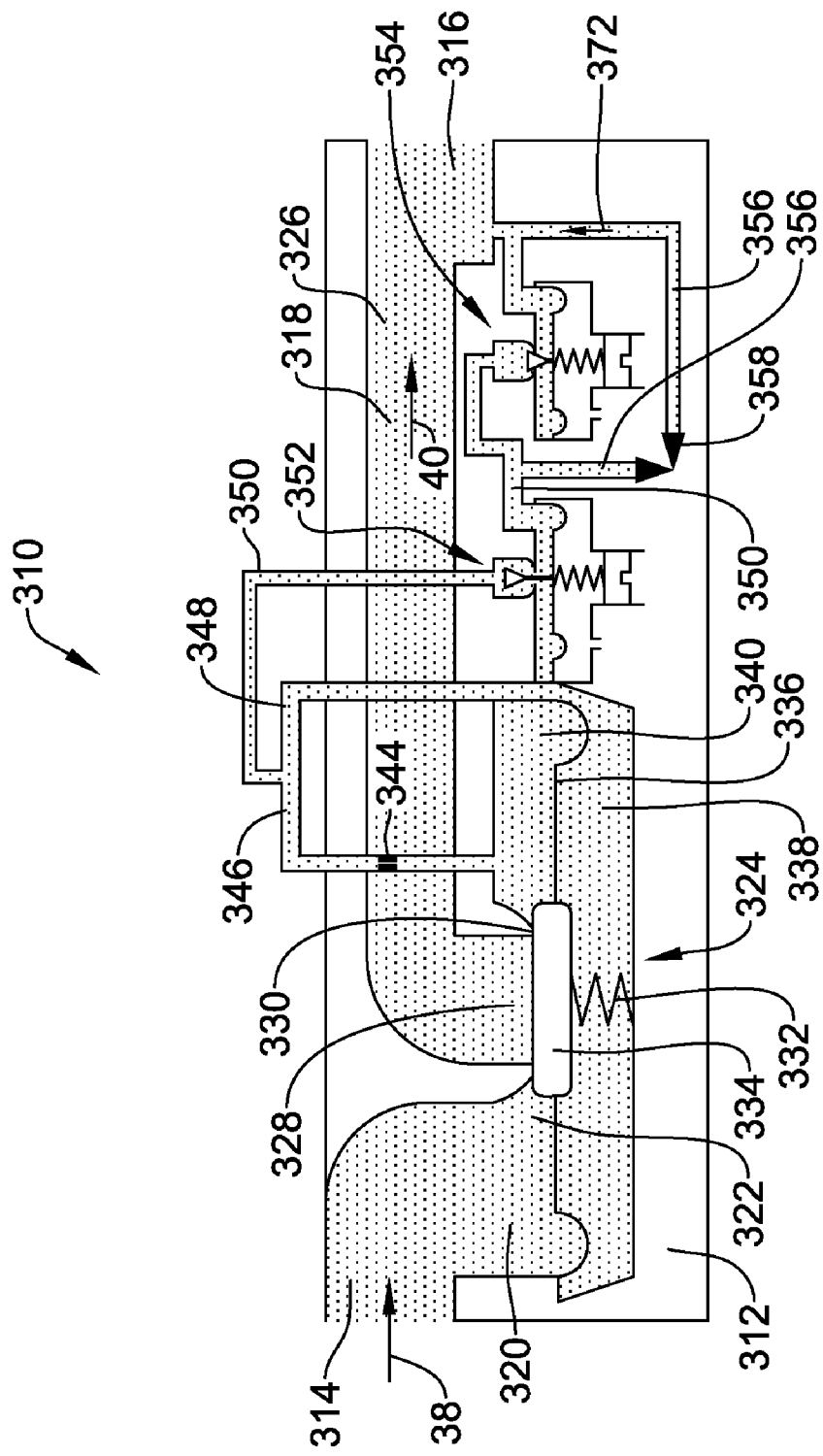
FIG. 14 is a schematic cross-sectional view showing the modulating gas valve of FIG. 12 with the diaphragm switch in an open position for bypassing gas pressure around the low-fire pressure regulator.

In a second position depicted in FIG. 14, activation of the diaphragm switch 358 causes the gas pressure within the control gas conduit 350 to be diverted through the regulator control gas channel 356, as indicated generally by arrow 372. When this occurs, the low-fire pressure regulator 354 closes, and the control gas pressure fed to the second flow chamber 326 is governed by the high-fire set point provided by the high-fire pressure regulator 352. To modulate the gas flow 40 outputted by the gas valve 310 between the high-fire and low-fire set points provided by the pressure regulators 352, 352, the frequency and/or duty cycle at which the diaphragm switch 358 is activated or pulsed can be varied to selectively introduce the low-fire pressure regulator 354 into the control gas conduit 350. If, for example, a lower gas flow 40 output from the gas valve 310 is desired, the frequency and/or duty cycle at which the diaphragm switch 358 activates can be increased, causing the control gas pressure to be fed through the low-fire pressure regulator 354 more often. Conversely, if a higher gas flow 40 output from the gas valve 310 is desired, the frequency and/or duty cycle at which the diaphragm switch 358 activates can be decreased, causing the control gas pressure to be fed through the regulator control gas channel 356 less often.

While the illustrative embodiment shows a modulating gas valve 310 having a pressure-to-close configuration employing two pressure regulators in series with each other, it should be understood that the gas valve 310 can be configured as a pressure-to-open type gas valve, if desired. In such valve configuration, the pulsed diaphragm switch 358 can be configured to divert gas pressure around the high-fire pressure regulator 352 to transition to low pressure. In addition, while a pulsed diaphragm switch 358 is shown in the illustrative embodiment for modulating gas pressure to the low-fire pressure regulator 354, it should be understood that other suitable means for modulating gas flow could be employed, if desired.

Figure 15:
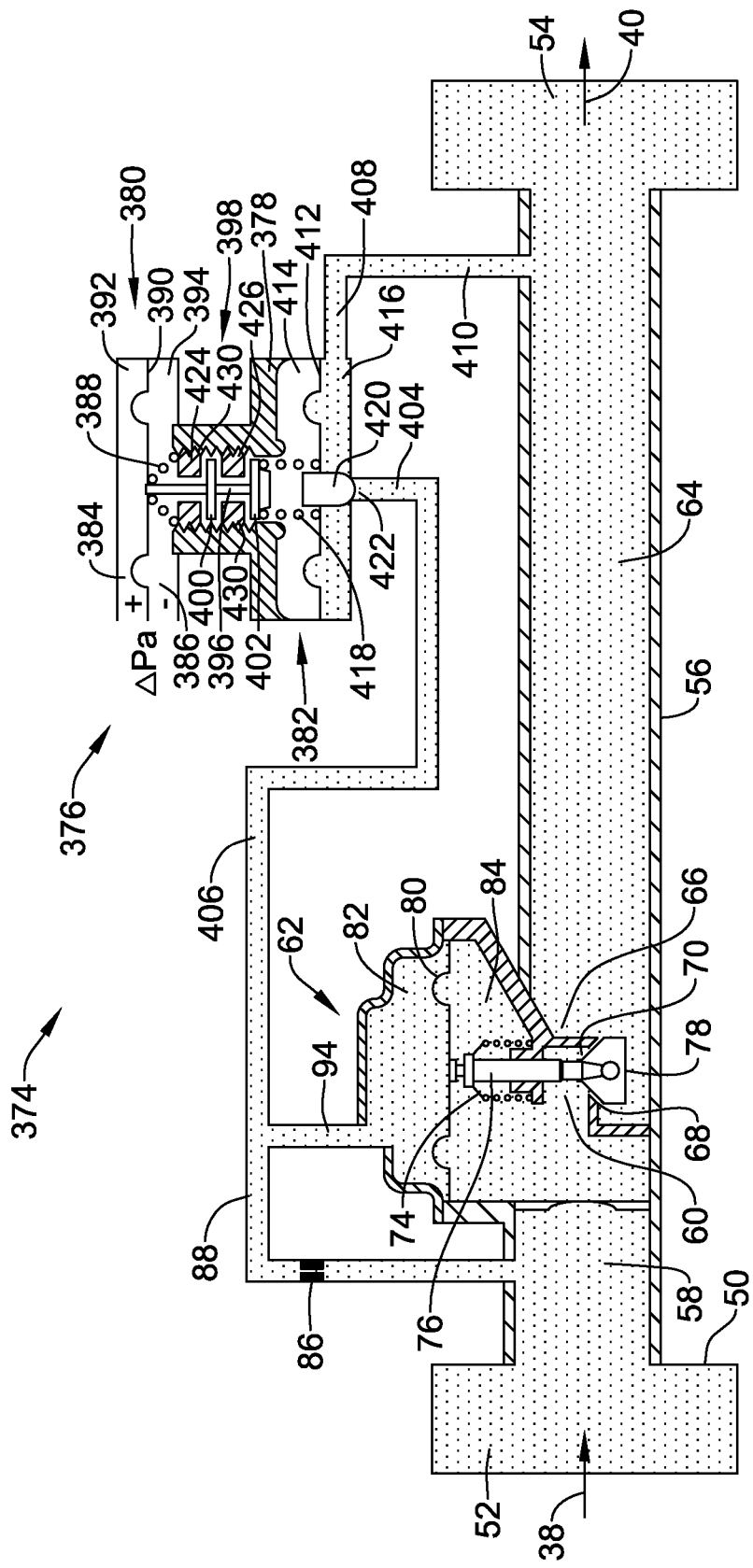
FIG. 15 is a schematic cross-sectional view of a modulating gas valve in accordance with another illustrative embodiment employing a combined modulator/regulator.

FIG. 15 is a schematic cross-sectional view of a modulating gas valve 374 in accordance with another illustrative embodiment employing a combined modulator/regulator valve. Modulating gas valve 374, illustratively a pressure-to-open gas valve, can be configured similar to gas valve 48 described above with respect to FIG. 2, with like elements labeled in like fashion in the drawings. In the illustrative embodiment of FIG. 15, however, the high-fire pressure regulator, low-fire pressure regulator, and modulator are shown combined into a single unit 376 that can be used to set both high-fire and low-fire set points for limiting the gas flow 40 outputted from the gas valve 374 and to variably throttle gas pressure discharged from the unit 376.

In the illustrative embodiment, the combined modulator/regulator 376 can include a housing 378 having an upper section 380 and a lower section 382. The upper section 380 of the housing 378 may define a pneumatic modulator having a first pneumatic port 384, a second pneumatic port 386, and a resilient biasing member 388 such as a spring operatively coupled to a diaphragm 390. The diaphragm 390 may define a first chamber 392 in fluid communication with the first pneumatic port 384 of the housing 378, and a second chamber 394 in fluid communication with the second pneumatic port 386 of the housing 378.

The diaphragm 390 can be operatively connected to a valve spool 396, which, in the illustrative embodiment, extends downwardly through an intermediation section 398 of the housing 378. The valve spool 396 can include a first stopper 400 and a second stopper 402, which are spaced apart from each other longitudinally along the length of the valve stem 396.

The lower section 382 of the housing 378 may define a pressure regulator having a gas flow inlet 404 in fluid communication with a first control gas channel 406, and a gas flow outlet 408 in fluid communication with a second control gas channel 410. A diaphragm 412 located within the lower section 382 defines a first chamber 414 and a second chamber 416, as shown. The upper portion of the diaphragm 412 can be connected to a second resilient biasing member 418, which, in turn, is connected to the second stopper 402 on the valve stem 396. The lower portion of the diaphragm 412 can be connected to a valve stopper 420, which based on the spring force provided by the resilient biasing member 418, is biased in a normally closed position against valve seat 422.

In use, the combined modulator/regulator 376 can be configured to variably modulate gas flow 40 outputted from the gas valve 374 between a low-fire set point and a high-fire set point based at least in part on the air pressure differential $\Delta P_a$ across the pneumatic inlet ports 384,386. The valve spool 396 can be configured to move up or down within the housing 378 depending on the air pressure differential $\Delta P_a$, causing the first and second stoppers 400,402 on the valve spool 396 to move back and forth relative to a low-fire regulator adjust 424 and a high-fire regulator adjust 426, which limit the travel of the valve spool 396. For example, when the air pressure differential $\Delta P_a$ across the pneumatic inlet ports 384,386 is low or zero, the upward biasing force providing by the resilient biasing member 388 causes the valve spool 396 to move upwardly within the housing 378, causing the first stopper 400 to engage the low-fire regulator adjust 424. In this position, the spring pressure within the second resilient member 418 is at its lowest, allowing low pressure control gas to be bypassed from channel 406 to channel 410.

As the air pressure differential $\Delta P_a$ across the pneumatic inlet ports 384,386 increases, the pressure differential across the modulator diaphragm 390 likewise increases, counteracting the upward biasing force provided by the resilient biasing member 388. When this occurs, the valve spool 396 moves downwardly within the intermediation section 398 of the housing 378, thus increasing the spring force on the regulator diaphragm 412 and causing the valve stopper 420 to allow higher pressure control gas to conduit 410. Once the air pressure differential $\Delta P_a$ is sufficiently high, the valve spool 396 is prevented from further downward movement via the high-fire regulator adjust 426. In this position, the spring pressure within the second resilient member 418 is at its highest, allowing less control gas to be bypassed from channel 406 to channel 410.

In some embodiments, the low-fire and high-fire set points established by the low-fire and high-fire regulator adjusts 400,402 can be adjusted to vary the range of gas flow 40 outputted from the gas valve 374. Adjustment of the regulator adjusts 400,402 can be accomplished, for example, via a threaded collar 428 that, when rotated, can be configured to engage threads 430 on the regulator adjusts 400,402, causing the regulator adjusts 400,402 to move relative to the valve spool 396. By adjusting the location of the regulator adjusts 400,402 relative to the valve spool 396, the amount of travel necessary for the stopper 400 to engage the adjusts 400,402 can be offset a desired amount, shifting the low-fire and high-fire set points.

Figure 16:
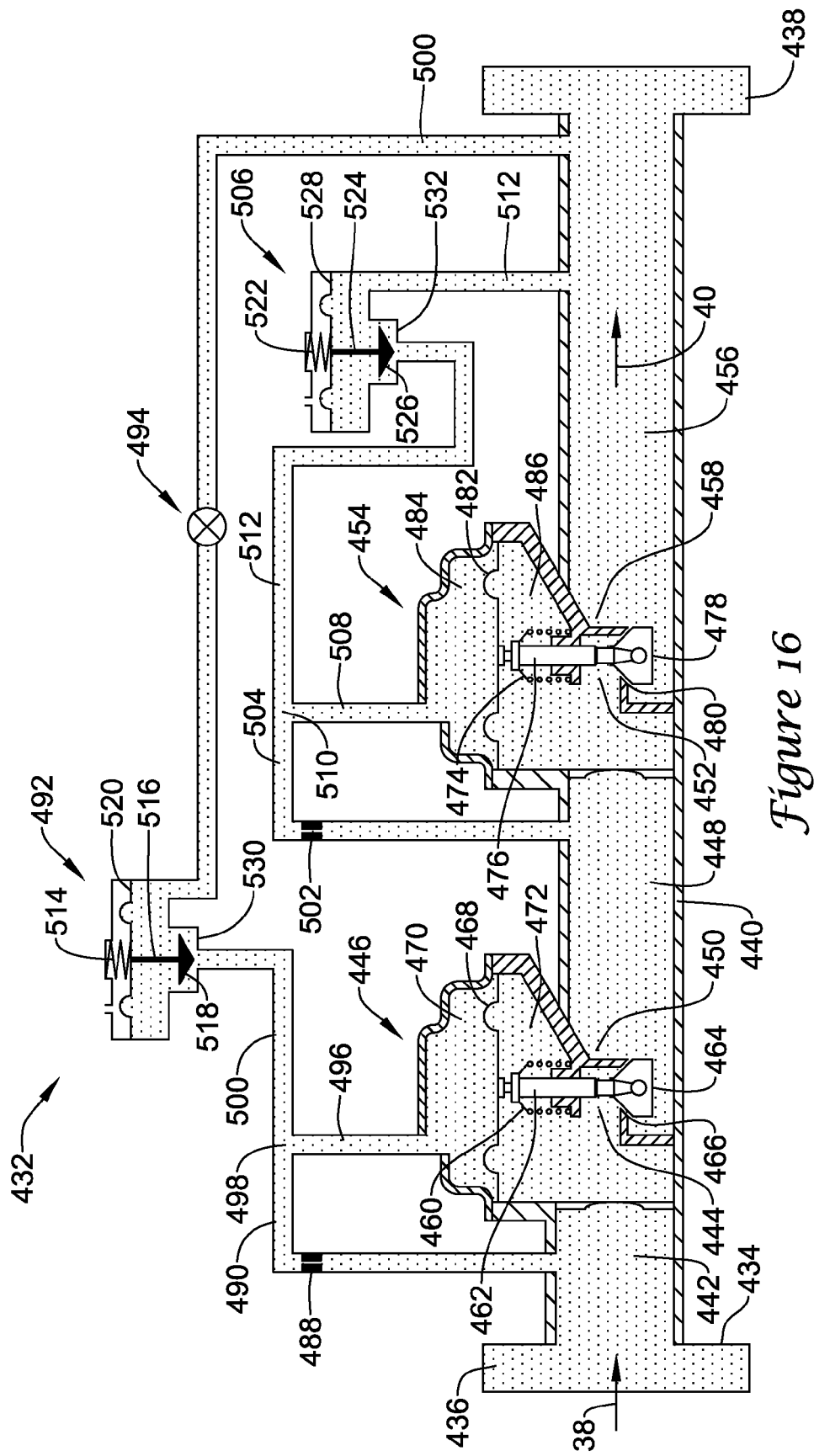
FIG. 16 is a schematic cross-sectional view of a pressure-to-open modulating gas valve employing multiple main valves.

FIG. 16 is a schematic cross-sectional view of a pressure-to-open modulating gas valve 432 in accordance with another illustrative embodiment employing multiple main valves. As shown in FIG. 16, the modulating gas valve 432 can include a valve body 434 having a gas inlet 436, a gas outlet 438, and a main gas conduit 440 connecting the gas inlet 436 and gas outlet 438. In the illustrative embodiment of FIG. 16, the main gas conduit 440 defines a first gas flow chamber 442 in fluid communication with the gas valve inlet 436 and the inlet 444 of a first main valve 446. A second gas flow chamber 448 of the main gas conduit 440, in turn, is in fluid communication with the outlet side 450 of the first main valve 446 and the inlet side 452 of a second main valve 454 downstream of the first main valve 446. A third gas flow chamber 456 of the main gas conduit 440, in turn, is in fluid communication with the outlet side 458 of the second main valve 454 and the gas valve outlet 438. In some embodiments, an on/off valve such as a solenoid valve can be provided at the gas valve inlet 436 to shut-off the supply of gas 38 fed into the first flow chamber 442, if desired.

The first and second main valves 446,454 can each be actuated relative to a respective valve seat within the main gas conduit 440, allowing each main valve 446,454 to move between a number of different positions for variably regulating the gas flow 40 outputted from the gas valve 432. The first main valve 446 may comprise a diaphragm-type valve including a resilient biasing member 460 such as a spring operatively coupled to a valve stem 462 and stopper 464, which can be configured to move relative to a valve seat 466 to regulate the supply of gas 38 discharged into the second flow chamber 448. A diaphragm 468 disposed within the interior of the first main valve 446 and supported by the valve stem 462 may define a first chamber 470 and a second chamber 472. During operation, a sufficient pressure differential across the diaphragm 468 due to different gas pressures within the first chamber 470 and second chamber 472 can be configured to overcome the spring force provided by the resilient biasing member 460, causing the stopper 464 to move away from the valve seat 466 and open the first main valve 446.

The second main valve 454 can be configured similar to the first main valve 446, including a resilient biasing member 474 such as a spring operatively coupled to a valve stem 476 and stopper 478, which can be similarly configured to move relative to a valve seat 480 to regulate the supply of gas discharged into the third flow chamber 456. A diaphragm 482 disposed within the interior of the second main valve 454 and supported by the valve stem 476 may define a first chamber 484 and a second chamber 486, which can be configured to function in a manner similar to that of the first main valve 446 to move the stopper 478 away from the valve seat 480.

A first supply orifice 488 in fluid communication with the first flow chamber 442 of the main gas conduit 440 can be configured to supply gas through a first control gas conduit 490 that can be used to supply gas pressure to the first chamber 470 of the first main valve 446, and that can be used to supply gas pressure to a low-fire pressure regulator 492 and modulator 494. The control gas conduit 490 may supply gas pressure to the first chamber 470 of the first main valve 446 via a valve inlet conduit 496. At juncture 498, the control gas conduit 490 branches into a control gas channel 500 for diverting gas pressure through the low-fire pressure regulator 492 and modulator 494 and into the third flow chamber 456 downstream of the second main valve 454.

A second supply orifice 502 in fluid communication with the second flow chamber 448 of the main gas conduit 440 can be configured to supply gas pressure through a second control gas conduit 504 that can be used to supply gas pressure to the first chamber 484 of the second main valve 454, and that can be used to control gas pressure to a high-fire pressure regulator 506. The control gas conduit 504 may supply gas pressure to the first chamber 484 of the second main valve 454 via a valve inlet conduit 508. At juncture 510, the control gas conduit 504 further branches into a control gas channel 512 for diverting gas pressure through the high-fire pressure regulator 506 and into the third flow chamber 456 downstream of the second main valve 454.

The high-fire and low-fire pressure regulators 492,506 can each comprise a diaphragm-type regulator valve adjustable between an infinite or discrete number of positions, either manually or with the aid of a servo motor or other suitable drive mechanism. In some embodiments, for example, the low-fire pressure regulator 492 can include a spring 514 operatively coupled to a valve stem 516, stopper 518, and a diaphragm 520. In similar fashion, the high-fire pressure regulator 506 can include a spring 522 operatively coupled to a valve stem 524, stopper 526, and diaphragm 528. The springs 514,522 for each pressure regulator 492,506 can be configured to exert a biasing force on the valve stem 516,524, causing the stopper 518,526 to normally engage a valve seat 530,532. The biasing force provided by the springs 514,522 against the diaphragms 520,528 can be adjusted, and in some cases modulated, allowing the upper and lower pressure set point limits to be varied. While diaphragm-type regulator valves are specifically depicted, it should be understood that other types of regulator valves may be employed to regulate gas pressure.

During operation, the modulator 494 can be used to variably throttle the gas pressure within the first control gas conduit 500 between a number of infinite or finite positions to adjust the pressure within the first chamber 470 of the first main valve 446, thus controlling the gas pressure discharged from the first main valve 446. When the modulator 494 is fully closed, for example, the gas pressure outputted by the first main valve 446 will be high, causing the gas valve 432 to output gas flow 40 at the rate set by the high-fire pressure regulator 506. Conversely, when the modulator 494 is fully open, the gas pressure outputted by the first main valve 446 will be low, causing the gas valve 432 to output gas flow 40 at the rate set by the low-fire pressure regulator 492. By modulating the gas pressure at different rates via the modulator 494, the gas flow 40 outputted by the gas valve 432 can be adjusted between any number of different rates within the range established by the low-fire and high-fire pressure regulators 492, 506.

Figure 17:
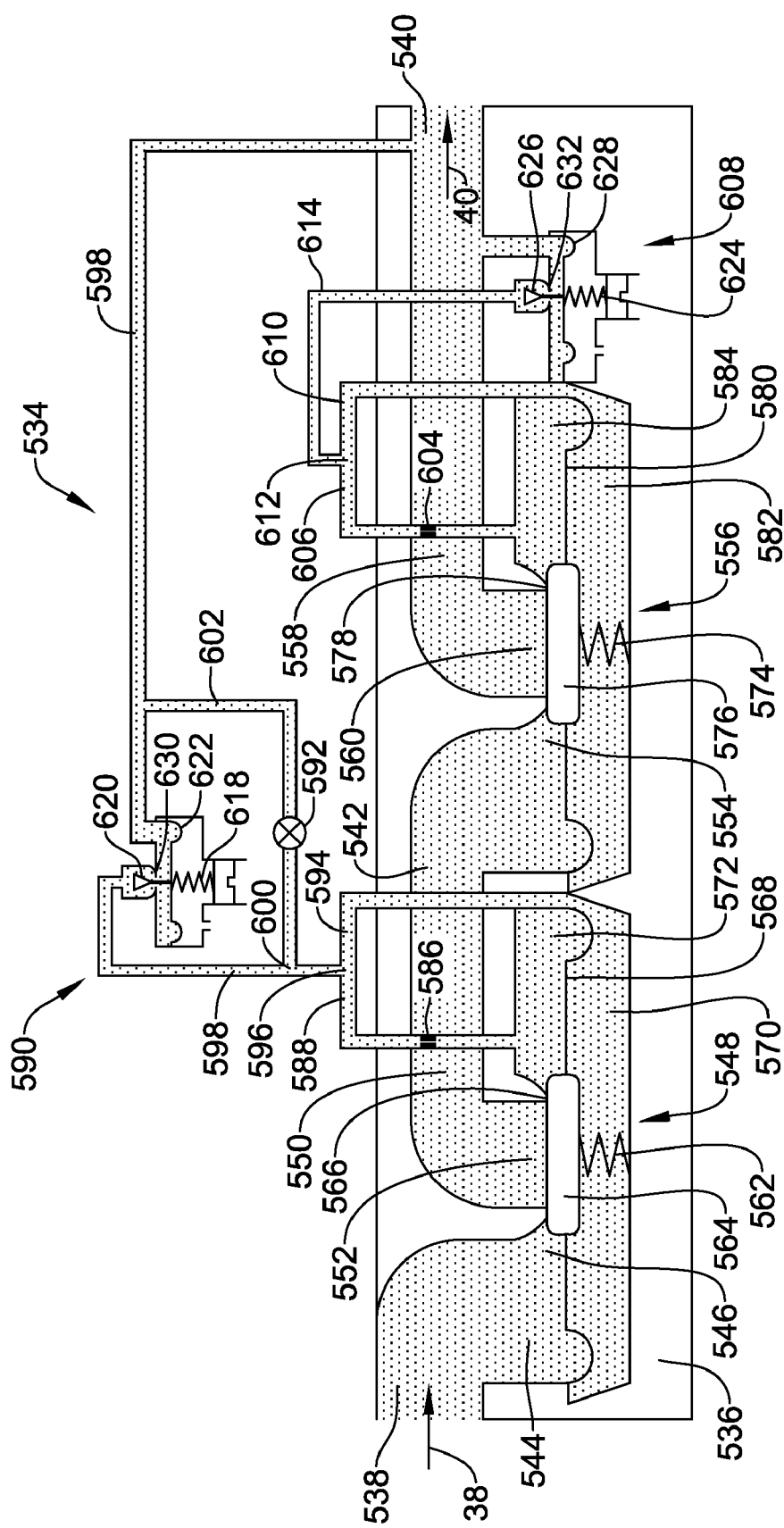
FIG. 17 is a schematic cross-sectional view of a pressure-to-close modulating gas valve employing multiple main valves.

FIG. 17 is a schematic cross-sectional view of a pressure-to-close modulating gas valve 534 in accordance with another illustrative embodiment employing multiple main valves. As shown in FIG. 17, the modulating gas valve 534 can include a valve body 536 having a gas inlet 538, a gas outlet 540, and a main gas conduit 542 connecting the gas inlet 538 and gas outlet 540. In the illustrative embodiment of FIG. 17, the main gas conduit 542 defines a first gas flow chamber 544 in fluid communication with the gas valve inlet 538 and the inlet 546 of a first main valve 548. A second gas flow chamber 550 of the main gas conduit 542, in turn, is in fluid communication with the outlet side 552 of the first main valve 548 and the inlet side 554 of a second main valve 556. A third gas flow chamber 558 of the main gas conduit 542, in turn, is in fluid communication with the outlet side 560 of the second main valve 556 and the gas valve outlet 540. In some embodiments, an on/off valve such as a solenoid valve can be provided at the gas valve inlet 538 to shut-off the supply of gas 38 fed into the first flow chamber 544, if desired.

The first and second main valves 548,556 can each be actuated relative to a respective valve seat within the main gas conduit 542, allowing each main valve 548,556 to move between a number of different positions for variably regulating the gas flow 40 outputted from the gas valve 534. The first main valve 548 may comprise a diaphragm-type valve including a resilient biasing member 562 such as a spring operatively coupled to a stopper 564, which can be configured to move relative to a valve seat 566 to regulate the supply of gas 38 discharged into the second flow chamber 550. A diaphragm 568 disposed within the interior of the first main valve 548 may define a first chamber 570 and a second chamber 572. During operation, a sufficient pressure differential across the diaphragm 568 due to different gas pressures within the first chamber 570 and second chamber 572 can be configured to overcome the spring force provided by the resilient biasing member 562, causing the stopper 564 to move away from the valve seat 566 and open the first main valve 548.

The second main valve 556 can be configured similar to the first main valve 548, including a resilient biasing member 574 such as a spring operatively coupled to a stopper 576, which can be similarly configured to move relative to a valve seat 578 to regulate the supply of gas discharged into the third flow chamber 558. A diaphragm 580 disposed within the interior of the second main valve 556 may likewise define a first chamber 582 and a second chamber 584, which can be configured to function in a manner similar to that of the first main valve 548 to move the stopper 576 towards the valve seat 578.

A first supply orifice 586 in fluid communication with the first flow chamber 544 of the main gas conduit 542 can be configured to supply gas through a first control gas conduit 588 that can be used to supply gas pressure to the first chamber 570 of the first main valve 548, and that can be used to supply gas pressure to a low-fire pressure regulator 590 and modulator 592. The control gas conduit 588 may supply gas pressure to the first chamber 570 of the first main valve 548 via a valve inlet conduit 594. At juncture 596, the control gas conduit 588 branches into a control gas channel 598 for diverting gas pressure to the low-fire pressure regulator 590. At a second juncture 600, the control gas channel 598 may further branch into a regulator control gas channel 602, which can be used to divert control gas pressure around the low-fire pressure regulator 590 to the third flow chamber 558.

A second supply orifice 604 in fluid communication with the second flow chamber 550 of the main gas conduit 542 can be configured to supply gas pressure through a second control gas conduit 606 that can be used to supply gas pressure to the first chamber 580 of the second main valve 556, and that can be used to control gas pressure to a high-fire pressure regulator 608. The control gas conduit 606 may supply gas pressure to the first chamber 580 of the second main valve 556 via a valve inlet conduit 610. At juncture 612, the control gas conduit 606 further branches into a control gas channel 614 for diverting gas pressure through the high-fire pressure regulator 608 and into the third flow chamber 558 downstream of the second main valve 556.

The high-fire and low-fire pressure regulators 590,608 can each comprise a diaphragm-type regulator valve adjustable between an infinite or discrete number of positions, either manually or with the aid of a servo motor or other suitable drive mechanism. In some embodiments, for example, the low-fire pressure regulator 590 can include a spring 618 operatively coupled to a stopper 620, and a diaphragm 622. In similar fashion, the high-fire pressure regulator 608 can include a spring 624 operatively coupled to a stopper 626, and a diaphragm 628. The springs 618,624 for each pressure regulator 590,608 can be configured to exert a biasing force on the stopper 620,626, biasing the stopper 620,626 away from a corresponding valve seat 630,632. The biasing force provided by the springs 618,624 against the diaphragms 622, 628 can be adjusted, and in some cases modulated, allowing the upper and lower pressure set point limits to be varied. While diaphragm-type regulator valves are specifically depicted, it should be understood that other types of regulator valves may be employed to regulate gas pressure.

During operation, the modulator 592 can be used to throttle the gas pressure through the regulator control gas channel 602 between a number of infinite or finite positions to adjust the pressure within the first chamber 570 of the first main valve 548, thus controlling the gas pressure discharged from the first main valve 548. When the modulator 592 is fully closed, for example, the gas pressure outputted by the first main valve 548 will be low, causing the gas valve 534 to output gas flow 40 at the rate set by the low-fire pressure regulator 590. Conversely, when the modulator 592 is fully open, the gas pressure outputted by the first main valve 548 will be high, causing the gas valve 534 to output gas flow 40 at the rate set by the high-fire pressure regulator 608. By modulating the gas pressure at different rates via the modulator 592, the gas flow 40 outputted by the gas valve 534 can be adjusted between any number of different rates within the range established by the low-fire and high-fire pressure regulators 590,608.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A modulating gas valve, comprising:
    a valve body including a gas inlet, a gas outlet, a main gas conduit in fluid communication with the gas inlet and gas outlet, and a control gas conduit;
    at least one main valve in fluid communication with the main gas conduit and control gas conduit, each main valve operable between a number of different pressures for variably regulating the flow of gas through the main gas conduit;
    at least one regulator adapted to regulate the gas pressure outputted from said at least one main valve between a first gas pressure and a second gas pressure different from the first gas pressure; and
    a modulator adapted to modulate the gas outputted from the gas valve at a pressure between said first and second gas pressures.

2. The modulating gas valve of claim 1, wherein said modulating gas valve is a pressure-to-open gas valve.

3. The modulating gas valve of claim 1, wherein said modulating gas valve is a pressure-to-close gas valve.

4. The modulating gas valve of claim 1, wherein said at least one main valve comprises a single main valve.

5. The modulating gas valve of claim 4, wherein said at least one regulator includes:
    a first regulator for regulating the gas pressure outputted from the main valve at said first gas pressure; and
    a second regulator for regulating the gas pressure outputted from the main valve at said second pressure.

6. The modulating gas valve of claim 5, wherein the control gas conduit includes:
    a first control gas channel in fluid communication with the first regulator, the first control gas channel adapted to deliver gas through the first regulator to the gas outlet of the main gas conduit; and
    a second control gas channel in fluid communication with the modulator and the second regulator, the second control gas channel adapted to deliver gas through the modulator and second regulator to the gas outlet of the main gas conduit;
    wherein the first control gas channel and second control gas channel are in parallel with each other.

7. The modulating gas valve of claim 5, wherein the control gas conduit includes:
    a control gas channel in fluid communication with the first and second regulators; and
    a regulator control gas channel in fluid communication with the modulator, the regulator control gas channel adapted to variably bypass or divert control gas pressure around at least one of said first and second regulators.

8. The modulating gas valve of claim 5, wherein said first regulator and said second regulator comprise a high-fire and low-fire pressure regulator, respectively.

9. The modulating gas valve of claim 8, wherein said high-fire and low-fire regulators are disposed in parallel with each other.

10. The modulating gas valve of claim 8, wherein said high-fire and low-fire regulators are disposed in series with each other.

11. The modulating gas valve of claim 4, wherein said at least one regulator and said modulator includes a single regulator having a low-fire pressure adjustment mechanism for adjusting control gas pressure and a high-fire pressure adjustment mechanism for adjusting control gas pressure.

12. The modulating gas valve of claim 1, wherein said at least one main valve comprises a first main valve and a second main valve.

13. The modulating gas valve of claim 12, wherein said at least one regulator includes:
    a first regulator for regulating the gas pressure outputted from the first main valve at said first gas pressure; and
    a second regulator for regulating the gas pressure outputted from the second main valve at said second gas pressure.

14. The modulating gas valve of claim 1, wherein said modulator is adapted to variably modulate the gas pressure outputted by said at least one main valve between an infinite number of pressures.

15. The modulating gas valve of claim 1, wherein said modulator is adapted to variably modulate the gas pressure outputted by said at least one main valve between a number of discrete pressures.

16. The modulating gas valve of claim 1, wherein said modulator is adapted to variably modulate the gas pressure outputted by said at least one main valve between two pressures.

17. The modulating gas valve of claim 1, wherein said modulator includes a pneumatic modulator having a number of pneumatic inlet ports for receiving gas and/or fluid pressure provided by a gas-fired appliance operatively connected to the gas valve.

18. The modulating gas valve of claim 17, wherein the amount of throttling provided by the modulator is dependent at least in part on the pressure differential of the gas and/or fluid pressure across said pneumatic inlet ports.

19. The modulating gas valve of claim 1, wherein said modulator includes a mechanical or electrical modulator.

20. The modulating gas valve of claim 5, wherein said modulator includes a diaphragm switch adapted to variably bypass or disable control gas pressure delivered to the second regulator.

21. The modulating gas valve of claim 20, wherein said diaphragm switch is adapted to variably bypass or disable control gas pressure to the second regulator at a variable frequency and/or duty cycle for modulating the gas outputted by the main valve at a pressure between said first and second gas pressures.

22. A modulating gas valve, comprising:
a valve body including a gas inlet, a gas outlet, a main gas conduit in fluid communication with the gas inlet and gas outlet, and a control gas conduit;
at least one main valve in fluid communication with the main gas conduit and control gas conduit, each main valve operable between a number of different pressures for variably regulating the flow of gas through the main gas conduit;
at least one regulator adapted to regulate the gas pressure outputted from the main valve at a high-fire gas pressure and a low-fire gas pressure; and
a modulator adapted to variably modulate the gas outputted from the gas valve at a pressure between said high-fire and low-fire gas pressures.

23. A modulating gas valve, comprising:
a valve body including a gas inlet, a gas outlet, a main gas conduit in fluid communication with the gas inlet and gas outlet, and a control gas conduit;
a plurality of main valves each in fluid communication with the main gas conduit, each of said main valves operable between a number of different pressures for variably regulating the flow of gas through the main gas conduit;
at least one regulator adapted to regulate the gas pressure outputted from the gas valve between a high-fire gas pressure and a low-fire gas pressure different from the high-fire gas pressure; and
a modulator adapted to modulate the gas outputted from the gas valve at a pressure between said high-fire and low-fire gas pressures.

24. A system for modulating gas flow to a gas-fired appliance, the system comprising:
a modulating gas valve, comprising:
a valve body including a gas inlet, a gas outlet, a main gas conduit in fluid communication with the gas inlet and gas outlet, and a control gas conduit;
at least one main valve in fluid communication with the main gas conduit and control gas conduit, each main valve operable between a number of different pressures for variably regulating the flow of gas through the main gas conduit;
regulator means for regulating the gas pressure outputted from said at least one main valve between a first gas pressure and a second gas pressure different from the first gas pressure;
modulation means for modulating the gas outputted by the main valve at a pressure between said first and second gas pressures; and
a control unit operatively coupled to the gas valve for controlling the amount of throttling provided by the modulation means to actuate each main valve between two or more positions to variably regulate the flow of gas delivered to the gas-fired appliance.

25. The system of claim 24, wherein said modulating gas valve is a pressure-to-open gas valve.

26. The system of claim 24, wherein said modulating gas valve is a pressure-to-close gas valve.

27. The system of claim 24, wherein said at least one main valve comprises a single main valve.

28. The system of claim 27, wherein said regulator means for regulating the gas pressure outputted from the main valve between said first and second gas pressures includes:
a first regulator means for regulating the gas pressure outputted from the main valve at said first gas pressure; and
second regulator means for regulating the gas pressure outputted from the main valve at said second pressure.

29. The system of claim 28, wherein the control gas conduit includes:
a first control gas channel in fluid communication with the first regulator means, the first control gas channel adapted to deliver gas pressure through the first regulator means to the gas outlet of the main gas conduit; and
a second control gas channel in fluid communication with the modulation means and the second regulator means, the second control gas channel adapted to deliver gas pressure through the modulation means and second regulator means to the gas outlet of the main gas conduit;
wherein the first control gas channel and second control gas channel are in parallel with each other.

30. The system of claim 28, wherein the control gas conduit includes:
a control gas channel in fluid communication with the first and second regulator means; and
a regulator control gas channel in fluid communication with the modulation means, the regulator control gas channel adapted to divert gas pressure around at least one of said first and second regulator means.

31. The system of claim 28, wherein said first regulator means and said second regulator means comprise a high-fire and low-fire regulator, respectively.

32. The system of claim 31, wherein said high-fire and low-fire regulators are disposed in parallel with each other.

33. The system of claim 31, wherein said high-fire and low-fire regulators are disposed in series with each other.

34. The system of claim 27, wherein said regulator means and said modulation means includes a single regulator having a low-fire pressure adjustment mechanism for adjusting control gas pressure and a high-fire pressure adjustment mechanism for adjusting control gas pressure.

35. The system of claim 24, wherein said at least one main valve comprises a first main valve and a second main valve.

36. The system of claim 35, wherein said means for regulating the gas pressure outputted from said first and second main valves includes:
a first regulator means for regulating the gas pressure outputted from the first main valve at said first gas pressure; and a second regulator means for regulating the gas pressure outputted from the second main valve at said second gas pressure.

37. The system of claim 24, wherein said modulation means includes a modulator or switch adapted to variably modulate the gas pressure outputted by the main valve between an infinite number of positions.

38. The system of claim 24, wherein said modulation means includes a modulator or switch adapted to variably modulate the gas pressure outputted by said at least one main valve between a number of discrete positions.

39. The system of claim 24, wherein said modulation means includes a modulator or switch adapted to variably modulate the gas pressure outputted by said at least one main valve between two positions.

40. The system of claim 24, wherein said modulation means includes a pneumatic modulator having a number of pneumatic inlet ports for receiving gas and/or fluid pressure from one or more components of the gas-fired appliance.

41. The system of claim 40, wherein an amount of throttling provided by the pneumatic modulator depends at least in part on the pressure differential of the gas and/or fluid pressure across said pneumatic inlet ports.

42. The system of claim 28, wherein said modulation means includes a diaphragm switch adapted to variably bypass or disable control gas pressure to the second regulator means.

43. The system of claim 42, wherein said diaphragm switch is adapted to variably bypass or disable control gas pressure delivered to the second regulator means at a variable frequency and/or duty cycle for modulating the gas outputted by the main valve at a pressure between said first and second gas pressures.

* * * * *